United States Patent
Iida et al.

(10) Patent No.: US 10,737,257 B2
(45) Date of Patent: Aug. 11, 2020

(54) HONEYCOMB STRUCTURE

(71) Applicant: NGK INSULATORS, LTD., Nagoya (JP)

(72) Inventors: Tomohiro Iida, Nagoya (JP); Kazuto Miura, Nagoya (JP); Osamu Yasui, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 312 days.

(21) Appl. No.: 15/933,516

(22) Filed: Mar. 23, 2018

(65) Prior Publication Data

US 2018/0280957 A1    Oct. 4, 2018

(30) Foreign Application Priority Data

Mar. 30, 2017   (JP) ................. 2017-068303

(51) Int. Cl.
*B01J 35/02* (2006.01)
*C04B 38/00* (2006.01)
(Continued)

(52) U.S. Cl.
CPC .......... *B01J 35/023* (2013.01); *B01D 46/247* (2013.01); *B01D 46/2429* (2013.01); *B01D 46/2474* (2013.01); *B01J 35/0026* (2013.01); *C04B 38/0009* (2013.01); *C04B 38/0012* (2013.01); *F01N 3/0222* (2013.01); *F01N 3/035* (2013.01);
(Continued)

(58) Field of Classification Search
None
See application file for complete search history.

(56) References Cited

U.S. PATENT DOCUMENTS 4,740,408 A * 4/1988 Mochida ............... B01D 46/10
  422/179
4,767,309 A * 8/1988 Mizuno .................. B28B 3/269
  264/177.11

(Continued)

FOREIGN PATENT DOCUMENTS

JP    1987266298 A  * 11/1987
JP    2004-000896 A1   1/2004

OTHER PUBLICATIONS

Machine translation of JPS62-266298A (JP 1987-266298A) (Year: 1987).*

(Continued)

*Primary Examiner* — David Sample
*Assistant Examiner* — Elizabeth Collister
(74) *Attorney, Agent, or Firm* — Burr & Brown, PLLC

(57) ABSTRACT

A honeycomb structure includes a porous partition wall defining a plurality of cells, wherein the plurality of cells include a first cell and a second cell, an open frontal area of the first cell on the first end face is larger than that of the second cell on the second end face, on the partition wall disposed to surround the at least one first cell, a protrusion which protrudes into the first cell is provided with, the first protrusion and the second protrusion are each disposed not to overlap with each other on extended lines in extending directions of the respective protrusions, and a protrusion height (H1) of the first protrusion and a protrusion height (H2) of the second protrusion are each equal to or more than 15% and equal to or less than 90% with respect to a mutual distance W of the partition walls facing each other.

3 Claims, 11 Drawing Sheets

(51) Int. Cl.
    *B01D 46/24*     (2006.01)
    *B01J 35/00*     (2006.01)
    *F01N 3/28*      (2006.01)
    *F01N 3/035*     (2006.01)
    *F01N 3/022*     (2006.01)
    *C04B 111/00*    (2006.01)

(52) U.S. Cl.
    CPC ........ *F01N 3/2828* (2013.01); *B01D 46/2459* (2013.01); *B01D 2046/2433* (2013.01); *B01D 2046/2481* (2013.01); *B01D 2046/2492* (2013.01); *B01D 2255/9205* (2013.01); *C04B 2111/0081* (2013.01); *C04B 2111/00793* (2013.01); *F01N 2240/20* (2013.01); *F01N 2260/06* (2013.01); *F01N 2330/06* (2013.01); *F01N 2330/34* (2013.01); *F01N 2570/14* (2013.01)

(56) References Cited

U.S. PATENT DOCUMENTS

| | | | |
|---|---|---|---|
| 2002/0045541 A1* | 4/2002 | Koike | B01J 35/04 502/251 |
| 2005/0076627 A1* | 4/2005 | Itou | B01D 39/2068 55/523 |
| 2014/0154144 A1* | 6/2014 | Aoki | B01J 35/0006 422/180 |
| 2014/0154145 A1* | 6/2014 | Aoki | B01J 35/0006 422/180 |
| 2016/0160720 A1 | 6/2016 | Sadaoka et al. | |
| 2017/0065919 A1* | 3/2017 | Yamanishi | B28B 11/006 |

OTHER PUBLICATIONS

U.S. Appl. No. 15/933,497, filed Mar. 23, 2018, Tomohiro Iida et al.
German Office Action (Application No. 10 2018 204 660.3) dated May 22, 2020.

* cited by examiner

HONEYCOMB STRUCTURE

The present application is an application based on JP-2017-068303 filed on Mar. 30, 2017 with Japan Patent Office, the entire contents of which are incorporated herein by reference.

BACKGROUND OF THE INVENTION

Field of the Invention

The present invention relates to a honeycomb structure. More particularly, the present invention relates to a honeycomb structure capable of reducing a pressure loss and improving trap efficiency when being used as a filter.

Description of the Related Art

Conventionally, as a device for trapping particulate matters in exhaust gas emitted from an internal combustion engine such as a diesel engine or for purifying toxic gas components such as CO, HC, and NOx, a filter using a honeycomb structure has been known. The honeycomb structure is a structure having porous partition walls disposed to surround a plurality of cells which are a fluid channel. The partition walls configuring the honeycomb structure are made of, for example, porous ceramics such as cordierite and silicon carbide. Hereinafter, the particulate matter may be referred to as "PM". The PM stands for "particulate matter".

In the filter using the honeycomb structure, a plugging portion is disposed in an open end on any one of the cells partitioned by the porous partition walls, and the PM contained in the exhaust gas is removed by the porous partition walls. Hereinafter, the filter using the honeycomb structure may be referred to as a "honeycomb filter". For example, the honeycomb filter has a structure in which an open end on an inflow end face side and an open end on an outflow end face for the plurality of cells are plugged to each other, and therefore the porous partition wall serves as a filter for removing PM. In such a honeycomb filter, if exhaust gas containing PM is introduced from the inflow end face, the PM contained in the exhaust gas is trapped by the porous partition wall when the exhaust gas passes through the porous partition wall. By doing so, the exhaust gas emitted from the outflow end face of the honeycomb filter becomes gas from which the PM is removed. In addition, it has been known that the honeycomb filter can purify toxic gas components in the exhaust gas by a catalyst loaded in pores on the partition walls.

When the honeycomb filter is used for a long period of time, ash or the like in the exhaust gas is deposited in a cell (hereinafter, referred to as "inflow cell") in which the inflow end face side is open, and as a result the pressure loss may be suddenly increased. As a measure to prevent such a phenomenon, efforts have been made to increase a filtration area or an open frontal area in the inflow cell. Specifically, the structure in which cross-sectional shapes orthogonal to extending directions of the inflow cell and the outflow cell are different has been proposed (for example, Patent Document 1). Such a structure may be referred to as, for example, an HAC structure. The HAC structure stands for a "high ash capacity structure". In addition, the above-described outflow cell is a "cell in which the outflow end face side is open".

[Patent Document 1] JP-A-2004-896

SUMMARY OF THE INVENTION

However, in the honeycomb filter as described in Patent Document 1, the exhaust gas passing through the partition wall tends to concentrate in the vicinity of the outflow end face side. For this reason, there is a problem in that a wall passage flow velocity at which the exhaust gas passes through the partition wall is increased in the vicinity of the outflow end face side of the honeycomb filter and the pressure loss of the honeycomb filter is increased. In addition, there is a problem in that if the exhaust gas passing through the partition wall concentrates in the vicinity of the outflow end face side, the trap performance of the honeycomb filter deteriorates.

Here, the problem of the above-described wall passage flow velocity tends to be improved by making an open frontal area $OFA_{IN}$ of the inflow cell smaller than an open frontal area $OFA_{OUT}$ of the outflow cell (i.e., $OFA_{IN}<OFA_{OUT}$). However, when the improvement is attempted by such a method, the inflow cell has a problem in that the pressure loss may be increased due to a reduction in a deposition capacity for depositing ash or the like or a reduction in a geometric surface area on the inflow end face side. Hereinafter, the geometric surface area may be referred to as "GSA". The GSA stands for "geometric surface area". Similarly, the problem of the wall passage flow velocity tends to be improved by making a hydraulic diameter $HD_{IN}$ of the inflow cell smaller than a hydraulic diameter $HD_{OUT}$ of the outflow cell (i.e., $HD_{IN}<HD_{OUT}$). Even in this case, however, when the ash or the like is deposited in the inflow cell, the pressure loss may be increased.

The present invention has been made considering the problems of the prior art. An object of the present invention is to provide a honeycomb structure capable of reducing a pressure loss and improving trap efficiency.

According to the present invention, a honeycomb structure shown below is provided.

[1] The honeycomb structure includes a porous partition wall defining a plurality of cells which becomes a fluid channel extending from a first end face to a second end face, wherein the plurality of cells include a first cell in which an end portion on the first end face side is open and an end portion on the second end face side is plugged and a second cell in which the end portion on the first end face side is plugged and the end portion on the second end face side is open, the honeycomb structure is configured to pass the fluid introduced from the first end face side through the partition wall to emit the fluid into the second cell as a filtration fluid and emit the filtration fluid from the second end face side, in a cross section orthogonal to an extending direction of the cell, the first cell is disposed around the second cell, an open frontal area of the first cell on the first end face is larger than that of the second cell on the second end face, on the partition wall disposed to surround the at least one first cell, each of the at least one pair of partition walls having the first cell sandwiched therebetween is provided with a protrusion which protrudes into the first cell, among the two protrusions disposed on the partition walls facing each other, the protrusion disposed on the first partition wall is defined as a first protrusion and the protrusion disposed on the second partition wall is defined as a second protrusion, the first protrusion and the second protrusion are each disposed not to overlap with each other on extended lines in extending directions of the respective protrusions, and a protrusion height H1 of the first protrusion and a protrusion height H2 of the second protrusion are each equal to or more than 15% and equal to or less than 90% with respect to a mutual distance W of the partition walls facing each other.

[2] The honeycomb structure according to [1], wherein a width Y1 of the first protrusion is smaller than a thickness T1 of the partition wall provided with the first protrusion, and a width Y2 of the second protrusion is smaller than a thickness T2 of the partition wall provided with the second protrusion.

[3] The honeycomb structure according to [1] or [2], wherein the total number of protrusions protruding into the one first cell is equal to or less than 4.

The honeycomb structure according to the present invention can reduce the pressure loss and improve the trap efficiency. For example, it is possible to increase the channel resistance of the first cell while maintaining the open frontal area $OFA_{IN}$ of the first cell which is the inflow cell, the geometric surface area (GSA), the hydraulic diameter $HD_{IN}$, or the like to some extent by installing the protrusion in the first cell which is the inflow cell. For this reason, when the first end face of the honeycomb structure is the inflow end face, it is possible to increase the channel resistance of the first cell and adjust the exhaust gas passing through the inside of the first cell to pass through the partition wall at the position near the first end face. Therefore, according to the honeycomb structure of the present invention, it is possible to achieve the effect of maintaining the wall passage flow velocity more uniformly, suppressing the increase in the pressure loss, and suppressing the reduction in the trap efficiency, in the extending direction of the cell. Due to the above-described effects, since the open frontal area $OFA_{IN}$ of the first cell which is the inflow cell need not be greatly reduced, it is possible to effectively secure even the deposition capacity for depositing ash or the like.

DESCRIPTION OF THE PREFERRED EMBODIMENTS

Hereinafter, embodiments of the present invention will be described, but the present invention is not limited to the following embodiments. Therefore, it should be understood that appropriate changes, improvements and the like of the following embodiments based on the ordinary knowledge of those skilled in the art fall within the scope of the present invention without deviating from the purposes of the present invention.

Figure 1:
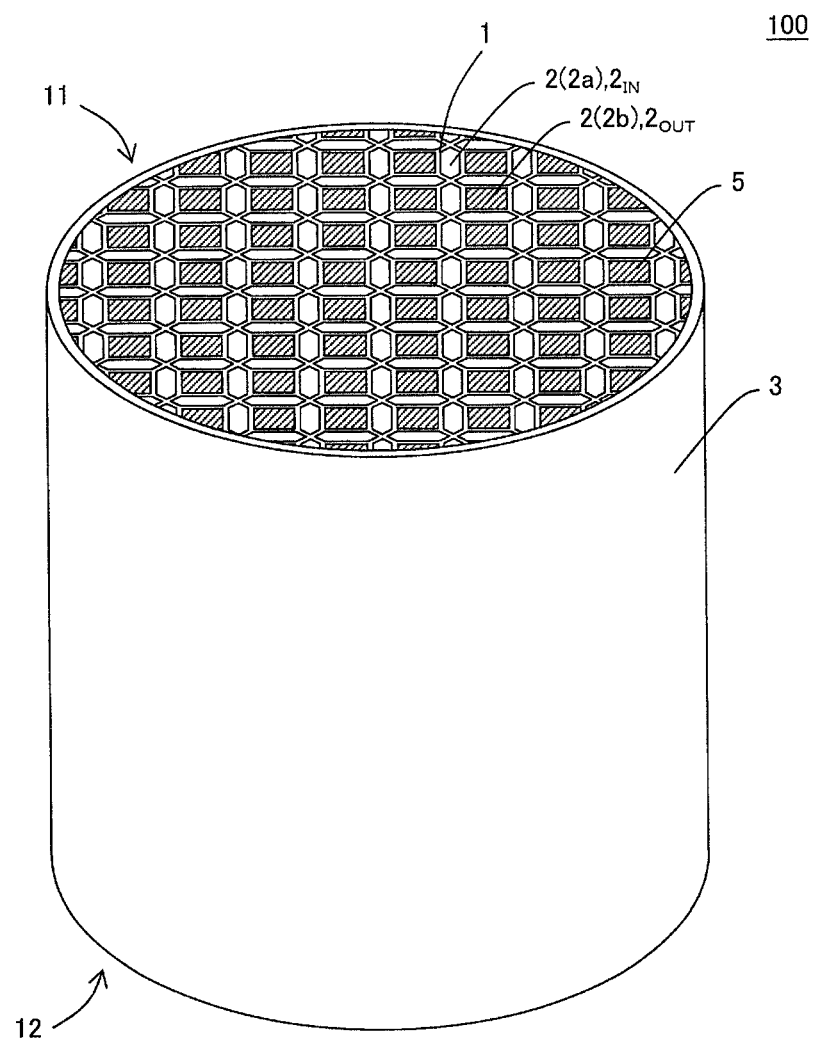
FIG. 1 is a perspective view schematically showing a honeycomb structure according to an embodiment of the present invention as viewed from a first end face side.
Figure 2:
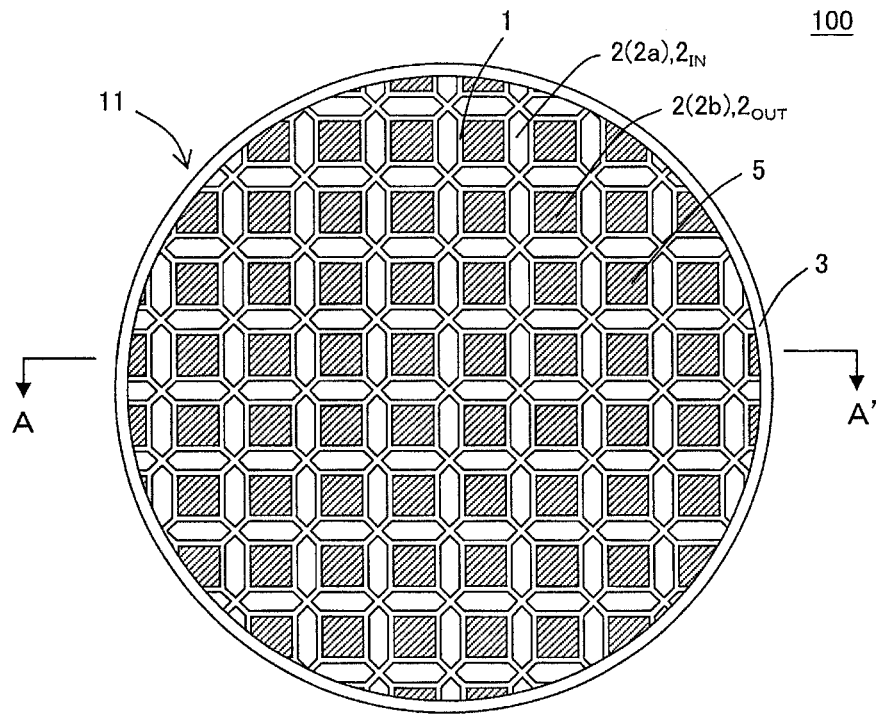
FIG. 2 is a plane view schematically showing a first end face of the honeycomb structure shown in FIG. 1.
Figure 3:
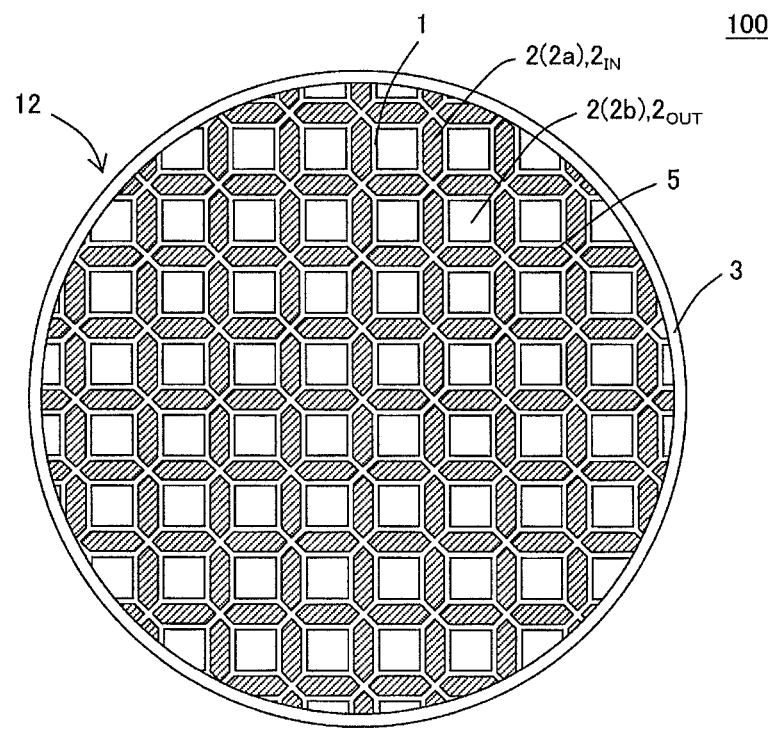
FIG. 3 is a plane view schematically showing a second end face of the honeycomb structure shown in FIG. 1.
Figure 4:
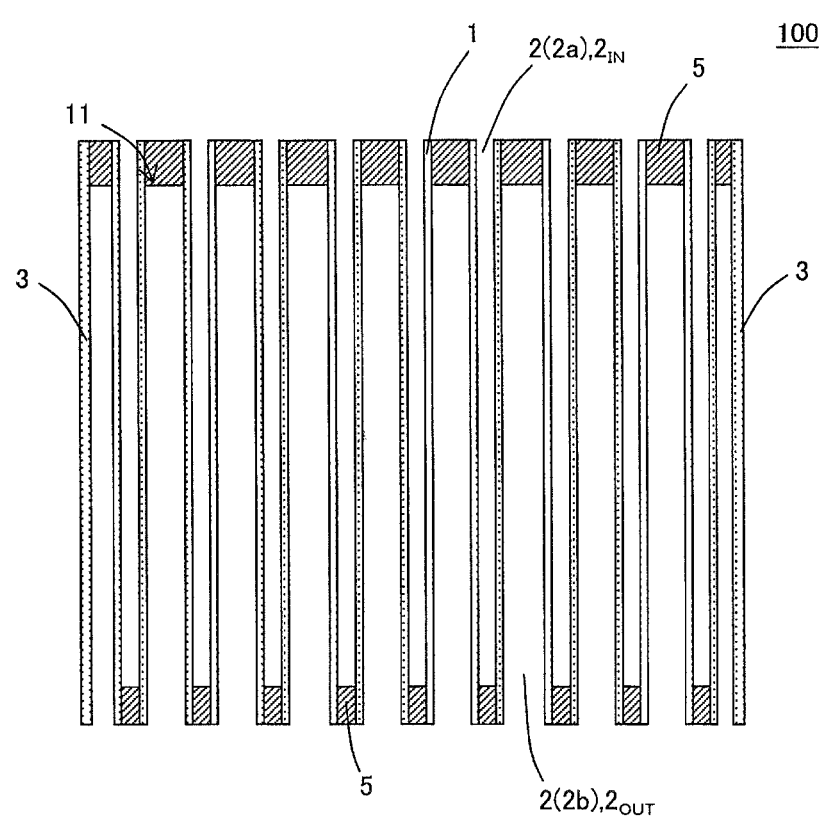
FIG. 4 is a cross-sectional view schematically showing a cross section taken along line A-A' of FIG. 2.

(1) Honeycomb Structure:

As shown in FIGS. 1 to 4, according to a first embodiment of the present invention, a honeycomb structure 100 includes a porous partition wall 1. The honeycomb structure 100 has a pillar shape which has a first end face 11 and a second end face 12. The honeycomb structure 100 shown in FIGS. 1 to 4 further includes a circumferential wall 3 which is disposed to surround the porous partition wall 1. FIG. 1 is a perspective view schematically showing a honeycomb structure according to an embodiment of the present invention as viewed from a first end face side. FIG. 2 is a plane view schematically showing the first end face of the honeycomb structure shown in FIG. 1. FIG. 3 is a plane view schematically showing the second end face of the honeycomb structure shown in FIG. 1. FIG. 4 is a cross-sectional view schematically showing a cross section taken along line A-A' of FIG. 2.

For example, the honeycomb structure 100 is used as a filter for purifying exhaust gas. In this case, the first end face 11 is an inflow end face into which the exhaust gas is introduced. The second end face 12 is an outflow end face from which the exhaust gas is emitted. That is, the honeycomb structure 100 of the present embodiment is configured to pass a fluid introduced from the first end face 11 side, for example, the exhaust gas through the partition wall 1 to emit the fluid into a second cell 2b as a filtration fluid and emit the filtration fluid from the second end face 12 side. Hereinafter, the first end face 11 may be referred to as an inflow end face and the second end face 12 may be referred to as an outflow end face.

The porous partition wall 1 defines a plurality of cells 2 serving as a fluid channel extending from the first end face 11 to the second end face 12. That is, the plurality of cells 2 are surrounded by the partition wall 1 to form the fluid channel.

The plurality of cells 2 include a first cell 2a in which an end portion on the first end face 11 side is open and an end portion on the second end face 12 side is plugged and a second cell 2b in which an end portion on the first end face 11 side is plugged and an end portion on the second end face 12 side is open. In the case in which the first end face 11 is the inflow end face, the first cell 2a is a cell 2 into which unpurified exhaust gas is introduced, that is, an inflow cell $2_{IN}$. In the case in which the first end face 11 is the inflow end face, the second cell 2b is the cell 2 from which purified exhaust gas (that is, purified gas) is emitted, that is, an outflow cell $2_{OUT}$. The plugging at the end faces of each cell 2 is performed by plugging portions 5 which are disposed at opening end portions of each cell 2.

The first cell 2a is disposed around the second cell 2b in a cross section orthogonal to an extending direction of the cell 2 of the honeycomb structure 100. That is, the plurality of first cells 2a are disposed around one second cell 2b and disposed to surround the second cell 2b. To be sure, a space between the second cell 2b and the first cell 2a is partitioned by the porous partition wall 1.

As shown in FIGS. 2 and 3, according to the honeycomb structure 100 of the present embodiment, in the cross section orthogonal to the extending direction of the cell 2, the shape of the first cell 2a (inflow cell $2_{IN}$) is hexagonal, and the shape of the second cell 2b (outflow cell $2_{OUT}$) is quadrangular. Four first cells 2a are disposed around the quadrangular second cell 2b. It should be noted that in the cross section orthogonal to the extending direction of the cell 2, the shape of each cell 2 is not limited to the above-described shape.

An open frontal area $OFA_{IN}$ of the first cell 2a on the first end face 11 is larger than an open frontal area $OFA_{OUT}$ of the second cell 2b on the second end face 12. That is, the honeycomb structure 100 of the present embodiment satisfies the following Formula (1). In the following Formula (1), the "$OFA_{IN}$" represents the open frontal area of the first cell 2a on the first end face 11, and the "$OFA_{OUT}$" represents the open frontal area of the second cell 2b on the second end face 12. By such a configuration, the honeycomb structure 100 of the present embodiment can reduce a pressure loss when being used as a filter. It should be noted that the "open frontal area $OFA_{IN}$ of the first cell 2a on the first end face 11" is a percentage ($A1_{all}/S1 \times 100$) of a ratio of a total sum area $A1_{all}$ of the open end of the first cell 2a on the first end face 11 to the area S1 of the first end face 11. The "total sum area $A1_{all}$ of the open end of the first cell 2a" is the total area obtained by adding up the areas of the open ends of all the first cells 2a on the first end face 11. The "open frontal area $OFA_{OUT}$ of the second cell 2b on the second end face 12" is a percentage ($A2_{all}/S2 \times 100$) of a ratio of a total sum area $A2_{all}$ of the open end of the second cell 2b on the second end face 12 to the area S2 of the second end face 12. The "total sum area $A2_{all}$ of the open end of the second cell 2b" is the total area obtained by adding up the areas of the open end of all the second cells 2b on the second end face 12.

$$OFA_{IN} > OFA_{OUT} \quad \text{Formula 1}$$

Figure 5:
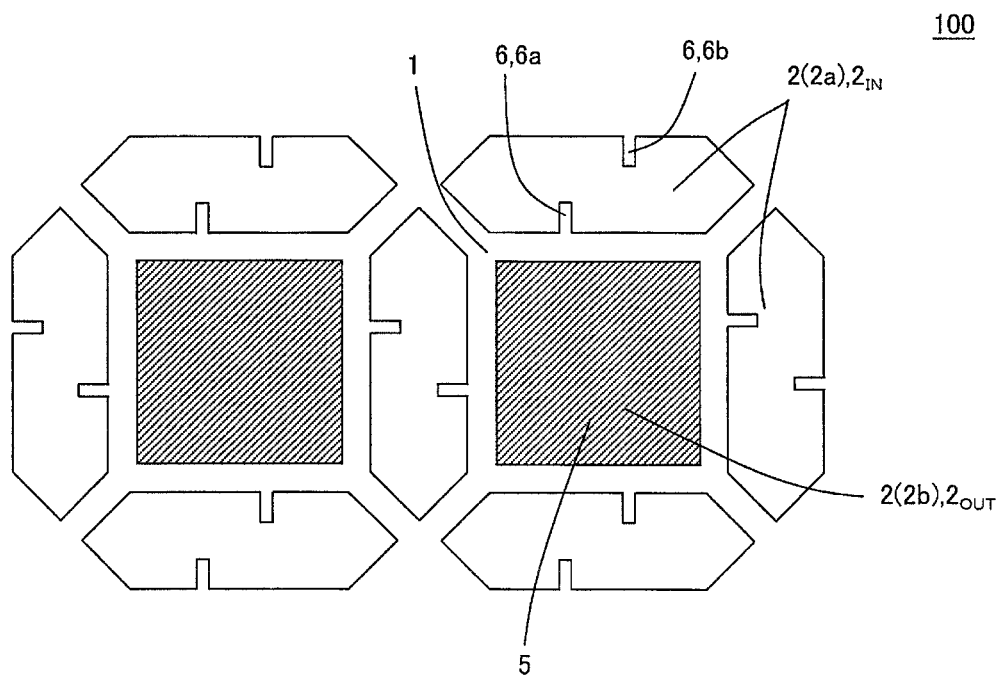
FIG. 5 is an enlarged plane view of a part of a first end face shown in FIG. 2.

In the honeycomb structure 100 of the present embodiment, as shown in FIG. 5, the partition wall 1 disposed to surround at least one first cell 2a is provided with the protrusion 6 which protrudes into the first cell 2a. In particular, the protrusion 6 is disposed on each of a pair of the partition walls 1 and 1 facing each other having the first cell 2a sandwiched therebetween to protrude into the first cell 2a. FIG. 5 is an enlarged plane view of a part of the first end face 11 shown in FIG. 2. It should be noted that FIGS. 1 to 4 are drawn in a state in which the protrusions 6 disposed on the partition wall 1 are omitted.

As shown in FIG. 5, among the two protrusions 6 and 6 disposed on the partition walls 1 facing each other, the protrusion 6 disposed on the first partition wall 1 is defined as a first protrusion 6a and the protrusion 6 disposed on the second partition wall 1 is defined as a second protrusion 6b. It should be noted that the first partition wall 1 is one partition wall 1 of the partition walls 1 facing each other, and the second partition wall 1 is the other partition wall 1 of the partition walls 1 facing each other. The first protrusion 6a and the second protrusion 6b described above are each disposed not to overlap with each other on the extended lines in the extending directions of the respective protrusions 6a and 6b. Hereinafter, the first protrusion 6a and the second protrusion 6b are simply referred to as the protrusions 6a and 6b.

Figure 8:
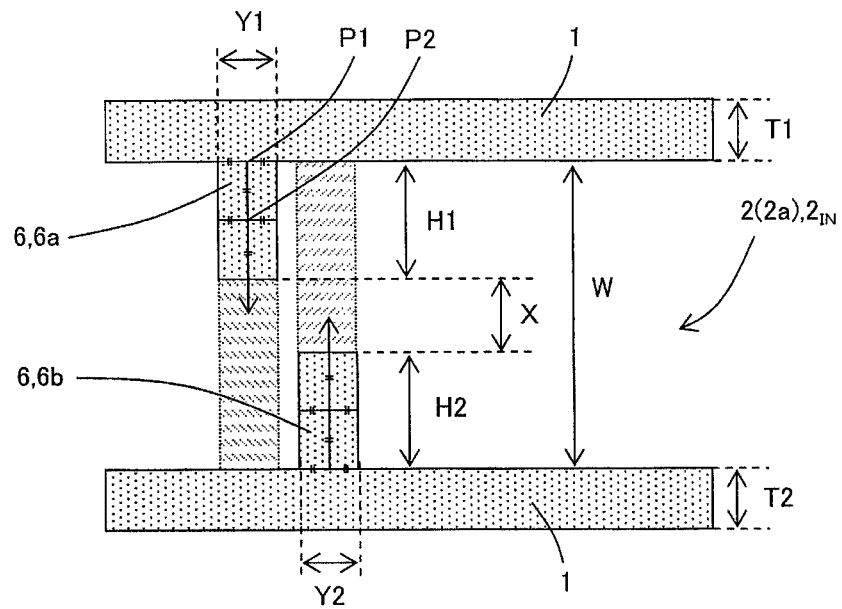
FIG. 8 is a schematic diagram for explaining an example of two protrusions disposed on partition walls facing each other.
Figure 9:
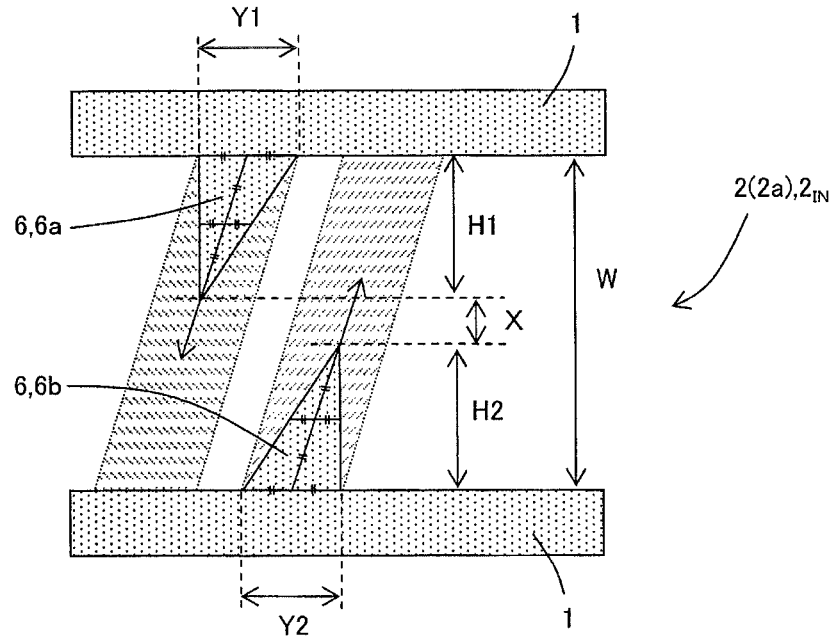
FIG. 9 is a schematic diagram for explaining another example of two protrusions disposed on partition walls facing each other.
Figure 10:
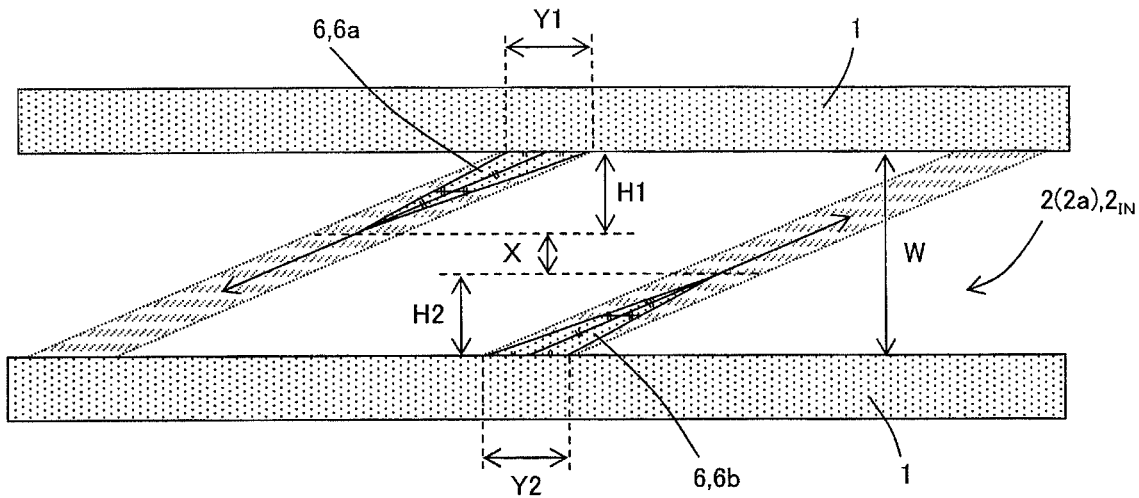
FIG. 10 is a schematic diagram for explaining still another example of two protrusions disposed on partition walls facing each other.

The state in which the "first protrusion 6a and the second protrusion 6b are each disposed not to overlap with each other on the extended lines in the extending directions of the respective protrusions 6a and 6b" is described with reference to FIGS. 8 to 10. FIG. 8 is a schematic diagram for explaining an example of two protrusions disposed on partition walls facing each other. FIG. 9 is a schematic diagram for explaining another example of two protrusions disposed on partition walls facing each other. FIG. 10 is a schematic diagram for explaining still another example of two protrusions disposed on partition walls facing each other.

First of all, the "extending direction of the protrusion 6" is described with reference to FIG. 8. The extending direction of the protrusion 6 means an extending direction of a line segment which connects a middle point P1 of a bottom portion of the protrusion 6 to a middle point P2 of a width of the protrusion 6 at a half position of a height H of the protrusion 6. Therefore, the "extending direction of the protrusion 6" does not necessarily pass through a distal end of the protrusion 6. In the following, an angle formed by the "extending direction of the protrusion 6" and the "extending direction of the partition wall 1 on which the protrusion 6 is disposed" may be represented as an angle defining the "extending direction of the protrusion 6". Here, the "extending direction of the partition wall 1 on which the protrusion 6 is disposed" means a direction along a surface of the partition wall 1 which is in contact with the bottom portion of the protrusion 6. For example, in FIG. 8, the angle formed by the "extending direction of the protrusion 6" and the "extending direction of the partition wall 1 on which the protrusion 6 is disposed" is 90°. Therefore, it can be said that the extending direction of the protrusion 6 shown in FIG. 8 is 90°. In the partition wall 1 which is in contact with the bottom portion of the protrusion 6, when the "extending direction of the partition wall 1 which is in contact with a bottom portion on one edge side" and the "extending direction of the partition wall 1 which is in contact with a bottom portion on the other edge side" are different from each other, two angles formed by the extending directions of the protrusion 6 may be obtained. In such a case, the angle of the side having the smaller of the two angles formed by the extending directions of the protrusions 6 is defined as the "extending direction of the protrusion 6".

The state in which the "first protrusion 6a and the second protrusion 6b are each disposed not to overlap with each other on the extended lines in the extending directions of the respective protrusions 6a and 6b" means the following state. First, in relation to the protrusion 6a, the width of the bottom portion of the protrusion 6a extends in the extending direction of the protrusion 6a. In the case in which at least a part of the other protrusion 6b exists on an extended point in the extending direction, the protrusion 6a overlaps with the protrusion 6b on the extended line in the extending direction thereof. Therefore, in the case where at least a part of the other protrusion 6b does not exist on the extended point in the extending direction, the protrusion 6a does not overlap with the protrusion 6b on the extended line of the extending direction of the protrusion 6a. Similarly, in relation to the other protrusion 6b, the width of the bottom portion of the protrusion 6b extends in the extending direction of the protrusion 6b. In the case where at least a part of the one protrusion 6a does not exist on the extended point in the extending direction, the protrusion 6b does not overlap with the protrusion 6a on the extended line of the extending direction of the protrusion 6b. The "protrusions 6a and 6b each do not overlap with each other" as described above means the state in which when viewing each of the two protrusions 6a and 6b, each of the other protrusions 6a and 6b disposed opposite to each other is not present on the extended lines in the respective extending directions.

For example, as shown in FIG. 9, even when the extending direction of the protrusions 6a and 6b is not perpendicular to the bottom portions of the protrusions 6a and 6b, similarly to FIG. 8, it is possible to perform a determination on whether or not the protrusions 6a and 6b overlap with each other.

For example, in the state shown in FIGS. 9 and 10, protrusions 6a and 6b each do not overlap with each other. For example, in FIG. 9, two protrusions 6a and 6b is disposed to protrude from a surface of partition walls 1 into a cell 2. The protrusion 6b does not exist on an extended line in an extending direction of the protrusion 6a, and the protrusion 6a does not also exist on an extended line in an extending direction of the protrusion 6b. Similarly, even in FIG. 10, the protrusion 6b does not exist on the extended line in the extending direction of the protrusion 6a, and the protrusion 6a does not also exist on the extended line in the extending direction of the protrusion 6b.

Since the two protrusions 6a and 6b in the state as shown in FIGS. 8 to 10 do not overlap with each other, such a state may be hereinafter referred to as the "two protrusions 6a and 6b do not face each other".

In the honeycomb structure 100 of the present embodiment, as one of features, the partition wall 1 disposed to surround the at least one first cell 2a is provided with the first protrusion 6a and the second protrusion 6b, and the first protrusion 6a and the second protrusion 6b do not face each other.

In addition, in the honeycomb structure 100 of the present embodiment, as one of features, a protrusion height H1 of the first protrusion 6a and a protrusion height H2 of the second protrusion 6b are each equal to or more than 15% and equal to or less than 90% with respect to a mutual distance W of the partition walls 1 facing each other. By such a configuration, the honeycomb structure 100 of the present embodiment can achieve the effects of maintaining the wall passing flow velocity more uniformly in the extending direction of the cell 2, suppressing the increase in the pressure loss, and suppressing the reduction in the trap efficiency. In addition, due to the above-described effects, since the open frontal area $OFA_{IN}$ of the first cell 2a which is the inflow cell $2_{IN}$ need not be greatly reduced, it is possible to effectively secure even the deposition capacity for depositing ash or the like.

The "mutual distance W" of the partition walls 1 means a maximum distance between the partition wall 1 provided with the first protrusion 6a and the partition wall 1 provided with the second protrusion 6b. In addition, the protrusion height H1 of the first protrusion 6a and the protrusion height H2 of the second protrusion 6b mean the heights of the respective protrusions 6a and 6b in a direction parallel to a direction in which the "mutual distance W" of the partition walls 1 described above is taken.

The protrusion height H1 of the first protrusion 6a, the protrusion height H2 of the second protrusion 6b, and the mutual distance W of the partition walls 1 can be obtained by the known methods such as image analysis or the like. Also, it can be confirmed whether the first protrusion 6a and the second protrusion 6b face each other by the known methods such as the image analysis.

If the protrusion height H1 of the first protrusion 6a and the protrusion height H2 of the second protrusion 6b are each less than 15% or exceed 90% with respect to the mutual distance W of the partition walls 1, the pressure loss of the honeycomb structure 100 is increased.

The protrusion height H1 of the first protrusion 6a is 15% or more and 90% or less, preferably, 20% or more and 70% or less, more preferably 25% or more and 50% or less, with respect to the mutual distance W of the partition walls 1 facing each other. In addition, the protrusion height H2 of the second protrusion 6b is 15% or more and 90% or less, preferably, 20% or more and 70% or less, more preferably 25% or more and 70% or less, with respect to the mutual distance W of the partition walls 1 facing each other. By such a configuration, it is possible to further reduce the pressure loss when the honeycomb structure 100 is used as the filter.

It is preferable that the width Y1 of the first protrusion 6a is smaller than the thickness T1 of the partition wall 1 provided with the first protrusion 6a. If the width Y1 of the first protrusion 6a is larger than the thickness T1 of the partition wall 1, the pressure loss of the honeycomb structure 100 may be increased. Here, the width Y1 of the first protrusion 6a may be a maximum value of the width of the first protrusion 6a in the direction orthogonal to the extending direction of the first protrusion 6a.

It is preferable that the width Y2 of the second protrusion 6b is smaller than the thickness T2 of the partition wall 1 provided with the second protrusion 6b. If the width Y2 of the second protrusion 6b is larger than the thickness T2 of the partition wall 1, the pressure loss of the honeycomb structure 100 may be increased. Here, the width Y2 of the second protrusion 6b may be a maximum value of the width of the second protrusion 6b in the direction orthogonal to the extending direction of the second protrusion 6b.

It is preferable that the total number of the protrusions 6 protruding into one first cell 2a is equal to or less than 4. If the total number of protrusions 6 is equal to or more than 5, the pressure loss of the honeycomb structure 100 may be increased.

In the first cell 2a, in relation to the partition wall 1 surrounding the first cell 2a, the number of first cells 2a in which the two protrusions 6a and 6b are disposed is not particularly limited. However, the number of first cells 2a in which the two protrusions 6a and 6b are disposed is preferably 90% or more, more preferably 95% or more, particularly preferably 100%, with respect to the total number of first cells 2a. By such a configuration, it is possible to more effectively reduce the pressure loss.

In the honeycomb structure 100 of the present embodiment, it is preferable that the open frontal area $OFA_{IN}$ of the inflow cell $2_{IN}$ may be larger than the open frontal area $OFA_{OUT}$ of the outflow cell $2_{OUT}$. However, the open frontal area $OFA_{IN}$ of the inflow cell $2_{IN}$ is preferably equal to or more than 1.05 times and less than 3.0 times the open frontal area $OFA_{OUT}$ of the outflow cell $2_{OUT}$, more preferably 1.1 to 2.9 times, still more preferably 1.2 to 2.7 times, particularly preferably 1.3 to 2.0 times. If the open frontal area $OFA_{IN}$ of the inflow cell $2_{IN}$ is less than 1.05 times the open frontal area $OFA_{OUT}$ of the outflow cell $2_{OUT}$, it may be difficult to obtain the reduction effect of the pressure loss. Meanwhile, if the open frontal area $OFA_{IN}$ of the inflow cell $2_{IN}$ exceeds 3.0 times the open frontal area $OFA_{OUT}$ of the outflow cell $2_{OUT}$, the open frontal area $OFA_{OUT}$ of the outflow cell $2_{OUT}$ becomes too small, such that it may be difficult to obtain the reduction effect of the pressure loss.

Figure 6A:
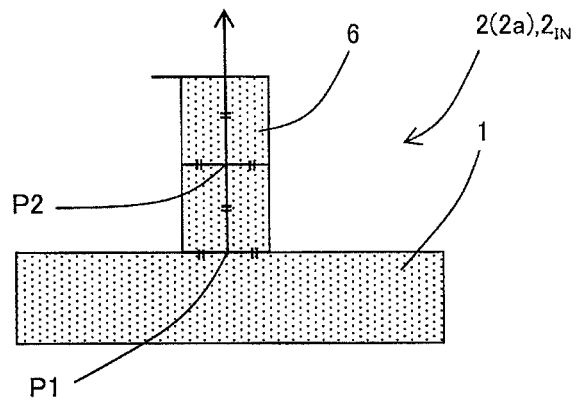
FIGS. 6A to 6C are schematic diagrams for explaining a shape of a protrusion protruding into a first cell.
Figure 6B:
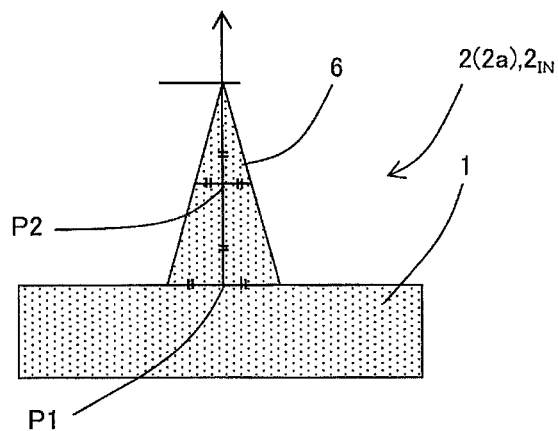
Figure 6C:
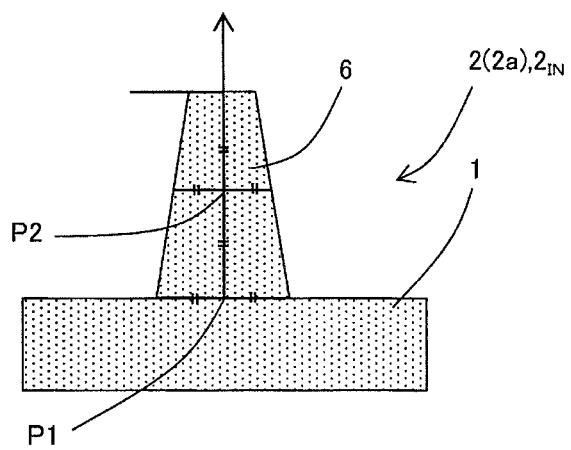
Figure 7A:
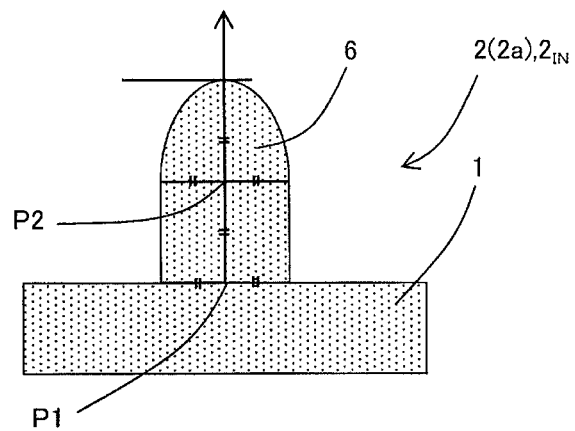
FIGS. 7A to 7C are schematic diagrams for explaining another shape of the protrusion protruding into the first cell.
Figure 7B:
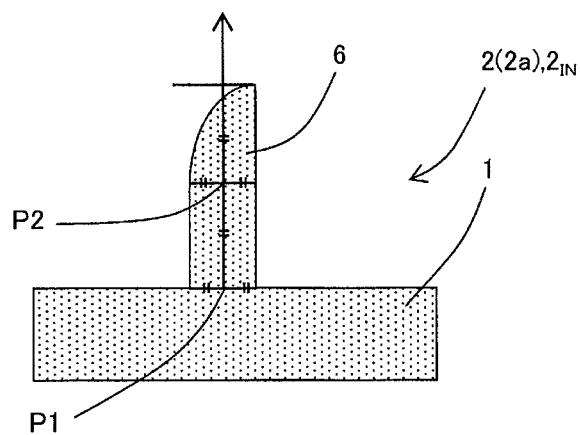
Figure 7C:
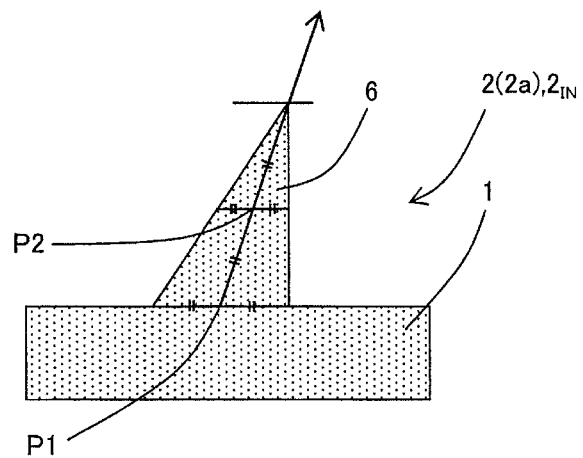

There is no particular restriction on the shape of the protrusion 6 protruding into the first cell 2a. For example, the protrusion 6 shown in FIG. 5 is configured so that the width of the protrusion 6 is constant from the skirt portion to the distal end, but the shape of the protrusion is not limited thereto. Hereinafter, an example of the shape of the protrusion 6 protruding into the first cell 2a is described with reference to FIGS. 6A to 6C and 7A to 7C. FIGS. 6A to 6C are schematic diagrams for explaining the shape of the protrusion protruding into the first cell. FIGS. 7A to 7C are schematic diagrams for explaining another shape of the protrusion protruding into the first cell. FIGS. 6A to 6C and FIGS. 7A to 7C are enlarged cross-sectional views of the partition wall 1 and the protrusion 6 disposed on the partition wall 1, in the cross section orthogonal to the extending direction of the cell 2.

The protrusion 6 shown in FIG. 6A is configured so that the width of the protrusion 6 is constant from the skirt portion to the distal end. The extending direction of the protrusion 6 is shown by an arrow in the drawing, and becomes the direction orthogonal to the surface of the partition wall 1.

The protrusion 6 shown in FIG. 6B is configured so that the width of the protrusion 6 is configured to be gradually reduced from the skirt portion to the distal end. Both side surfaces of the protrusion 6 are joined at the distal end of the protrusion 6, and in FIG. 6B, the shape of the protrusion 6 is an isosceles triangle. The extending direction of the protrusion 6 is shown by an arrow in the drawing, and becomes the direction orthogonal to the surface of the partition wall 1.

The protrusion 6 shown in FIG. 6C is configured so that the width of the protrusion 6 is configured to be gradually reduced from the skirt portion to the distal end. Both side surfaces of the protrusion 6 are not joined at the distal end of the protrusion 6, and in FIG. 6C, the shape of the protrusion 6 is a trapezoid. The extending direction of the protrusion 6 is shown by an arrow in the drawing, and becomes the direction orthogonal to the surface of the partition wall 1.

In the protrusion 6 shown in FIG. 7A, the width of the protrusion 6 is constant from the skirt portion to the middle point of the height, and thus the protrusion 6 on the distal end side has a circular arc shape. The extending direction of the protrusion 6 is shown by an arrow in the drawing, and becomes the direction orthogonal to the surface of the partition wall 1.

In the protrusion 6 shown in FIG. 7B, the width of the protrusion 6 is constant from the skirt portion to the middle point of the height, and thus the protrusion 6 on the distal end side has a semicircular arc shape. The extending direction of the protrusion 6 is shown by an arrow in the drawing, and becomes the direction orthogonal to the surface of the partition wall 1.

The protrusion 6 shown in FIG. 7C is configured so that the width of the protrusion 6 is configured to be gradually reduced from the skirt portion to the distal end. However, the lengths of the both side surfaces of the protrusion 6 are different from each other on one side surface and the other side surface, and in FIG. 7C, the shape of the protrusion 6 is a triangle. The extending direction of the protrusion 6 is shown by an arrow in the drawing, and becomes a direction toward an obliquely upward direction toward a right side of a page with respect to the surface of the partition wall 1.

Figure 11:
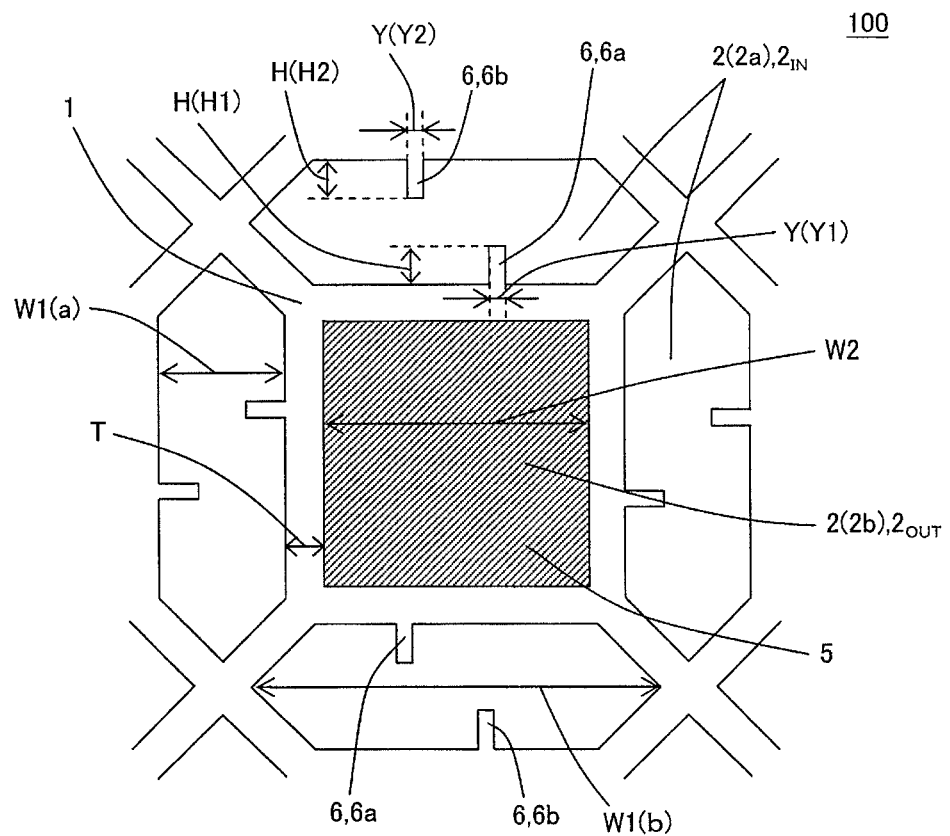
FIG. 11 is an enlarged plane view of a part of a first end face for explaining an example of the protrusion.
Figure 12:
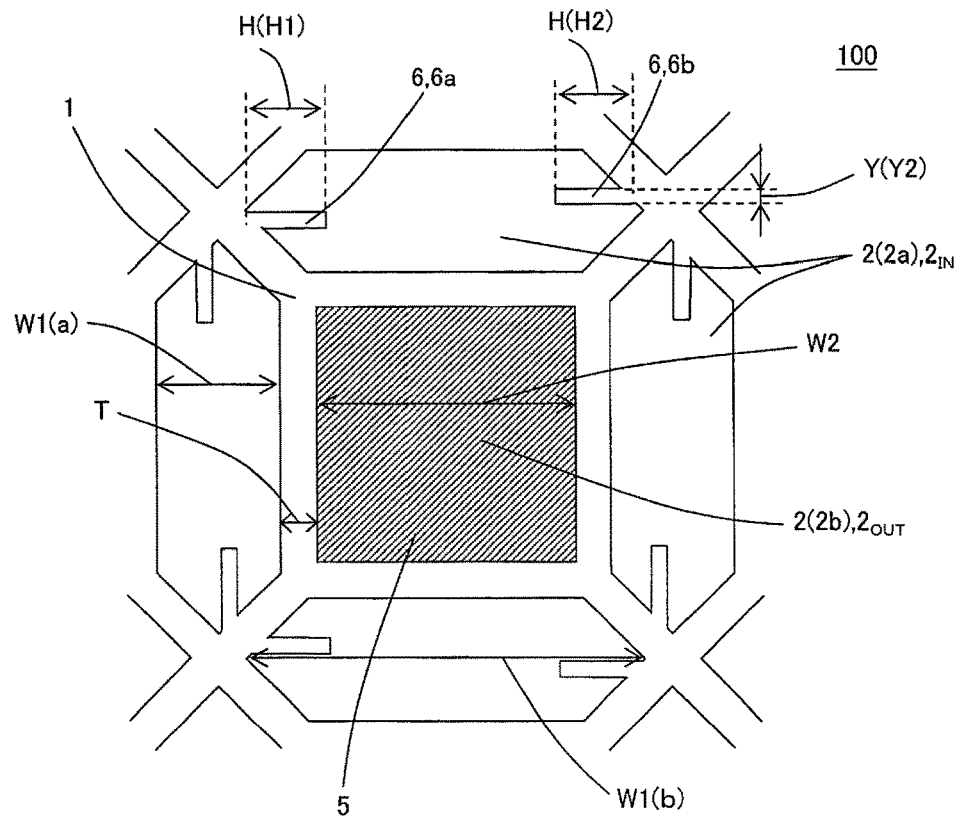
FIG. 12 is an enlarged plane view of a part of the first end face for explaining another example of the protrusion.
Figure 13:
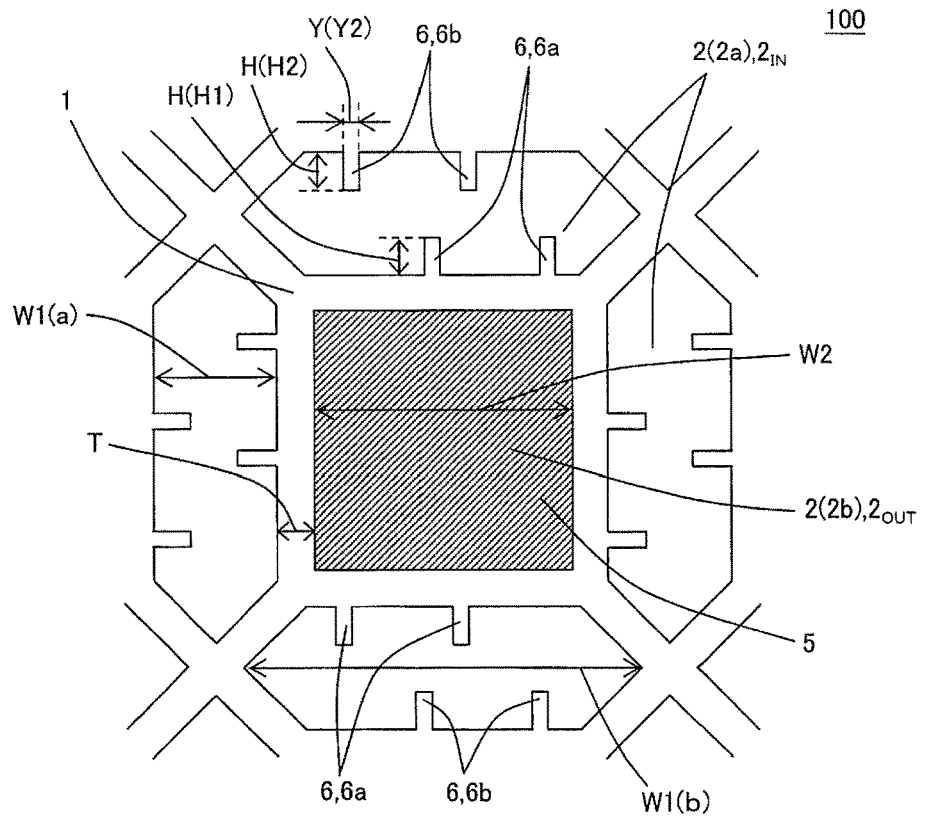
FIG. 13 is an enlarged plane view of a part of the first end face for explaining another example of the protrusion.
Figure 14:
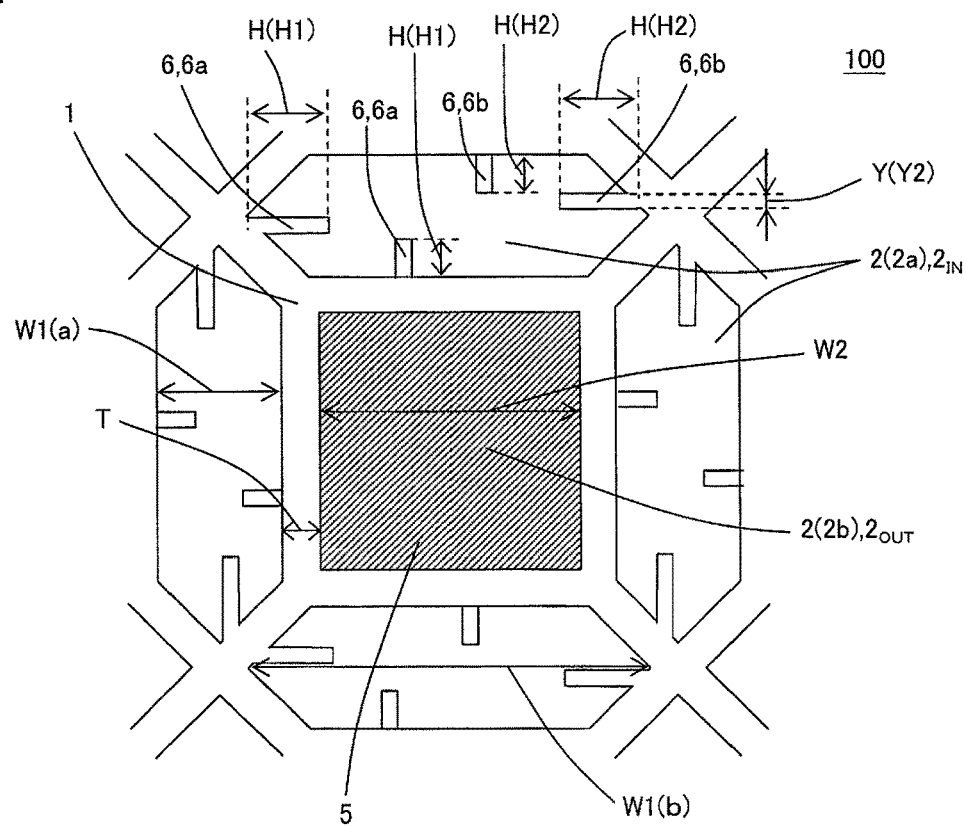
FIG. 14 is an enlarged plane view of a part of the first end face for explaining another example of the protrusion.

There are no particular restrictions on the disposition position of the protrusions 6 protruding into the first cell 2a. Examples of the disposition positions of the protrusions 6 can include those shown in FIGS. 11 to 14. FIG. 11 is an enlarged plane view of a part of the first end face for explaining an example of the protrusion. FIGS. 12 to 14 are enlarged plane views of a part of the first end face for explaining another example of the protrusion.

In FIG. 11, the two protrusions 6a and 6b disposed on the partition walls 1 facing each other are provided on the partition walls 1 which partition the first cell 2a and the second cell 2b. In FIG. 11, the "mutual distance W" of the partition walls 1 becomes a mutual distance W1(a) of the partition walls 1 which partition the first cell 2a and the second cell 2b.

In FIG. 12, the two protrusions 6a and 6b disposed on the partition walls 1 facing each other are provided on the partition walls 1 which partitions the first cells 2a from each other. In FIG. 12, the "mutual distance W" of the partition walls 1 becomes a distance from one intersection of the partition walls 1 which partition the first cells 2a from each other to the other intersection, that is, a mutual distance W1(b). In addition, the "heights H" of the two protrusions 6a and 6b, respectively, become the heights H1 and H2 of the protrusions, respectively, which are measured in the direction parallel to the direction in which the mutual distance W1(b) is taken.

In FIG. 13, there are two sets of two protrusions 6a and 6b disposed on the partition walls 1 facing each other. The two sets of two protrusions 6a and 6b are provided on the partition walls 1, respectively, which partition the first cell 2a and the second cell 2b.

In FIG. 14, there are two sets of two protrusions 6a and 6b disposed on the partition walls 1 facing each other. The first set of two protrusions 6a and 6b is provided on the partition walls 1 which partition the first cell 2a and the second cell 2b, and the second set of two protrusions 6a and 6b is provided at the intersection of the partition walls 1 which partition the first cells 2a from each other.

Figure 15:
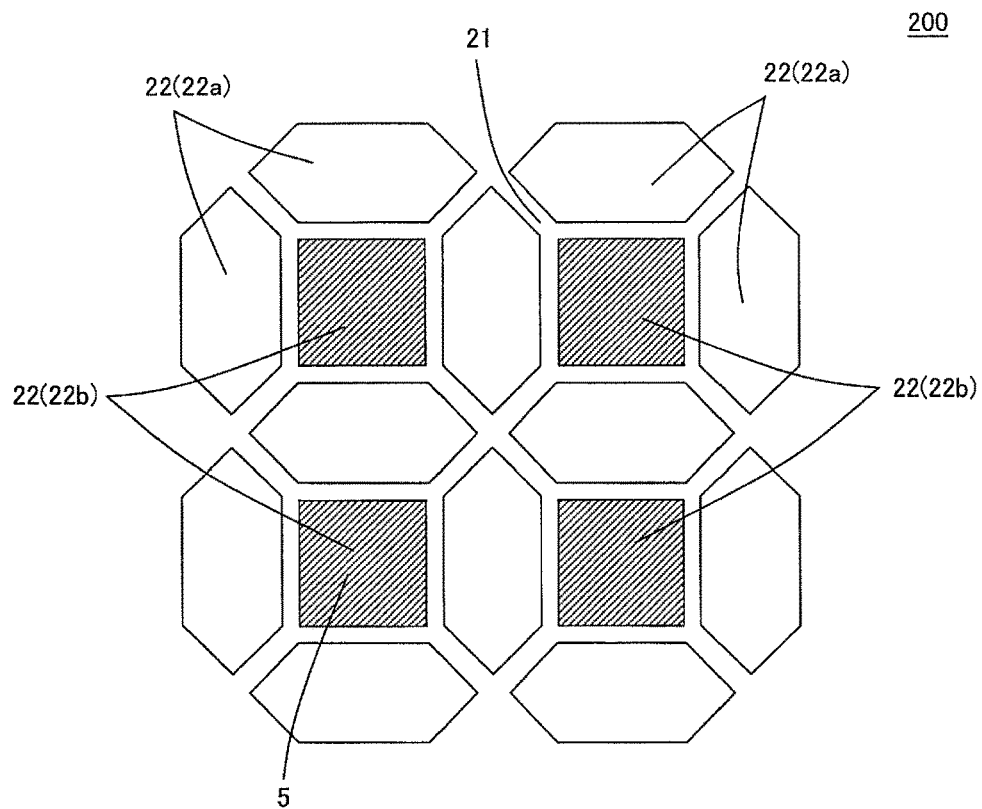
FIG. 15 is a schematic diagram for explaining a shape of a cell on a first end face side in a honeycomb structure according to another embodiment of the present invention.
Figure 16:
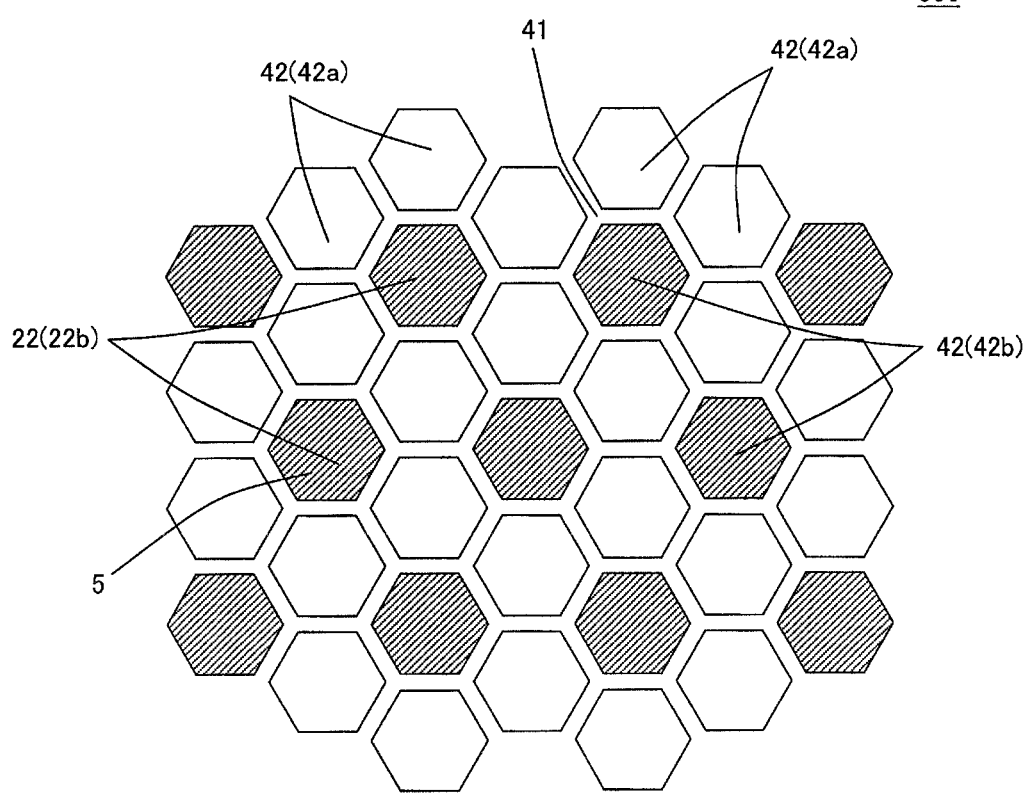
FIG. 16 is a schematic diagram for explaining a shape of a cell on a first end face side in a honeycomb structure according to still another embodiment of the present invention.
Figure 17:
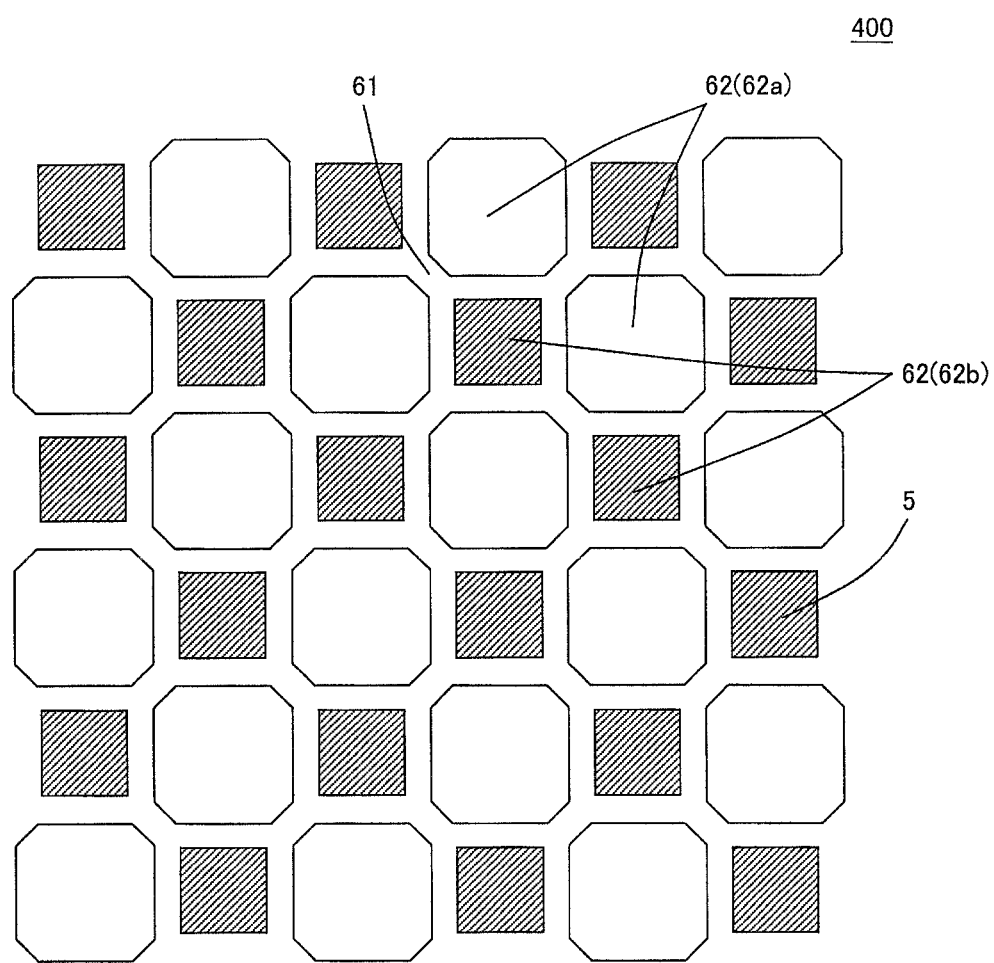
FIG. 17 is a schematic diagram for explaining a shape of a cell on a first end face side in a honeycomb structure according to still another embodiment of the present invention.

There are no particular restrictions on the shapes of the first cell 2a and the second cell 2b. Examples of the shapes of the first cell 2a and the second cell 2b can include shapes shown in FIGS. 15 to 17 in addition to the shapes described so far. FIG. 15 is a schematic diagram for explaining a shape of a cell on a first end face side in a honeycomb structure according to another embodiment of the present invention. FIG. 16 is a schematic diagram for explaining a shape of a cell on a first end face side in a honeycomb structure according to still another embodiment of the present invention. FIG. 17 is a schematic diagram for explaining a shape of a cell on a first end face side in a honeycomb structure according to still another embodiment of the present invention. In FIG. 15, reference numeral 21 represents a partition wall. In FIG. 16, reference numeral 41 represents a partition wall. In FIG. 17, reference numeral 61 represents a partition wall. FIGS. 15 to 17 are drawn in a state in which protrusions disposed on partition walls 21, 41, and 61 are omitted.

In the honeycomb structure 200 shown in FIG. 15, a shape of a first cell 22a is hexagon and a shape of a second cell 22b is a quadrangle. In the case of comparing the first cell 22a in FIG. 15 with the first cell 2a of the honeycomb structure 100 shown in FIGS. 1 to 5, the width of the first cell 22a sandwiched between the two second cells 22b is relatively wide. In the honeycomb structure 200 shown in FIG. 15, the open frontal area $OFA_{IN}$ of the first cell 22a is larger than the open frontal area $OFA_{OUT}$ of the second cell 22b.

In a honeycomb structure 300 shown in FIG. 16, shapes of a first cell 42a and a second cell 42b are both hexagonal. Since the shapes of the first cell 42a and the second cell 42b are each the same but a ratio of the number of first cells 42a and the number of second cells 42b is different, in the whole honeycomb structure 300, an open frontal area $OFA_{IN}$ of the first cell 42a is larger than an open frontal area $OFA_{OUT}$ of the second cell 42b.

In a honeycomb structure 400 shown in FIG. 17, a shape of a first cell 62a is octagon and a shape of a second cell 62b is a quadrangle. Even in a honeycomb structure 400 shown in FIG. 17, an open frontal area $OFA_{IN}$ of the first cell 62a is larger than an open frontal area $OFA_{OUT}$ of the second cell 62b.

In the honeycomb structure 100 as shown in FIGS. 1 to 5, the thickness of the partition wall 1 is preferably 0.15 to 0.40 mm, more preferably 0.18 to 0.35 mm, particularly preferably 0.20 to 0.33 mm. If the thickness of the partition wall 1 is less than 0.15 mm, the mechanical strength of the honeycomb structure 100 may be reduced. If the thickness of the partition wall 1 exceeds 0.40 mm, the pressure loss of the honeycomb structure 100 may be increased.

The material forming the partition wall 1 is not particularly limited, but from the viewpoint of strength, heat resistance, durability and the like, the main component of the material is preferably various kinds of ceramics or metals of oxides or non-oxides. Specifically, examples of the ceramics may include cordierite, mullite, alumina, spinel, silicon carbide, silicon nitride, aluminum titanate, and the like. Examples of the metal may include Fe—Cr—Al based metal, metal silicon, and the like. It is preferable to use one or more selected from these materials as the main component. It is particularly preferable to use one or two or more selected from the group consisting of alumina, mullite, aluminum titanate, cordierite, silicon carbide, and silicon nitride as the main component, from the viewpoint of the high strength, the high heat resistance, and the like. In addition, it is particularly preferable to use silicon carbide or a silicon-silicon carbide composite material from the viewpoint of the high thermal conductivity, the high heat resistance, and the like. Here, the "main component" means a component contained at a ratio of 50 mass % or more in the materials forming the partition wall 1. It is preferable that the main component is contained in the material forming the partition wall 1 at a ratio of 70 mass % or more, more preferably at a ratio of 80 mass % or more.

The whole shape of the honeycomb structure is not particularly limited. For example, in the whole shape of the honeycomb structure 100 shown in FIG. 1, the first end face 11 and the second end face 12 are a round pillar shape. Although not shown, as the whole shape of the honeycomb structure, the first end face and the second end face may be a substantially circular pillar shape such as an elliptical shape, a racetrack shape, and an oblong shape. In addition, as the whole shape of the honeycomb structure, the first end face and the second end face may also have a polygonal prismatic columnar shape such as a quadrangle and a hexagon.

A method for manufacturing a honeycomb structure is not particularly limited and therefore the honeycomb structure can be manufactured by, for example, the following method. First, a plastic kneaded material for manufacturing the honeycomb structure is prepared. The kneaded material for manufacturing the honeycomb structure is raw material powder and can be prepared by appropriately adding additives such as a binder and water to materials selected from the materials suitable for the partition wall.

Next, a pillar-shaped honeycomb formed body having partition walls defining a plurality of cells is obtained by extruding the prepared kneaded material. In the extrusion, as a die for the extrusion, it is preferable to use the die having the desired cell shape, partition wall thickness, and cell density. It is preferable to further dispose serrations corresponding to various protrusion shapes described so far from a slit for the extrusion of the partition wall as the die.

The obtained honeycomb formed body is dried by, for example, microwave and hot air, and is provided with the plugging portion by plugging the open end of the cell using the same material as the material used for the manufacturing of the honeycomb formed body. After the plugging portion is disposed, the honeycomb formed body may be further dried.

Next, the honeycomb structure of the present embodiment is obtained by firing the honeycomb formed body provided with the plugging portion. The firing temperature and the firing atmosphere vary depending on the raw materials, and those skilled in the art can select the firing temperature and the firing atmosphere most suitable for the selected material.

EXAMPLES

Hereinafter, the present invention is specifically described based on examples, but the present invention is not limited to these examples.

Example 1

The kneaded material was prepared by adding 5.5 parts by mass of a pore former, 90 parts by mass of a dispersing medium, 5.5 parts by mass of an organic binder, and 2.6 parts by mass of a surfactant, respectively, to 100 parts by mass of a cordierite forming raw material and mixing and kneading them. Alumina, aluminum hydroxide, kaolin, talc, and silica were used as the cordierite forming raw materials. Water was used as the dispersing medium, and a water absorbable resin was used as the pore former.

Next, the honeycomb formed body of which the entire shape is a round pillar shape was obtained by extruding the kneaded material using the die for manufacturing the honeycomb formed body. The honeycomb formed body was provided with a rectangular cell and a hexagonal cell which are defined by the partition walls. The honeycomb formed body was configured so that four hexagonal cells surround the rectangular cell. In the honeycomb formed body, as shown in FIG. 11, the protrusions 6a and 6b are disposed on the partition walls 1 facing each other, respectively. The partition walls 1 provided with the protrusions 6a and 6b is the partition walls 1 which partitions the first cell 2a and the second cell 2b when the open end of the cell 2 is provided with the plugging portion 5.

Next, after the honeycomb formed body was dried by a microwave dryer and further completely dried by a hot air dryer, both end faces of the honeycomb formed body were cut and adjusted to a predetermined dimension.

Next, a film was covered to cover the entire area of the end face of one side of the honeycomb formed body, and a perforated portion was open at a place corresponding to the open end of the rectangular cell of the film. Next, the open end of the rectangular cell was filled with a plugging material by dipping an end portion on a side covered with the film of the honeycomb formed body in a slurry-like plugging material containing the cordierite forming raw material. In the finally obtained honeycomb structure, the end face on one side of the honeycomb formed body was referred to as the inflow end face.

Next, a film was covered to cover the entire area of the other end face of the honeycomb formed body, and a perforated portion was open at a place corresponding to the open end of the hexagonal cell of the film. Next, the open end of the hexagonal cell was filled with a plugging material by dipping an end portion on a side covered with the film of the honeycomb formed body in the slurry-like plugging material containing the cordierite forming raw material. In the finally obtained honeycomb structure, the other end face of the honeycomb formed body was referred to as the outflow end face.

Next, the honeycomb structure according to the Example 1 was manufactured by degreasing and firing the honeycomb formed body in which the open ends of each cell are filled with the plugging material.

In the obtained honeycomb structure, as shown in FIG. 11, the partition walls 1 disposed to surround the inflow cell $2_{IN}$ were each provided with the protrusions 6a and 6b which protrude into the inflow cell $2_{IN}$. The two protrusions 6a and 6b were disposed so that the protrusions 6a and 6b do not overlap with each other on the extended lines in the extending directions of the respective protrusions 6a and 6b. The thickness of the partition wall 1 was 0.30 mm. In addition, the porosity of the partition wall 1 was 41%. The porosity of the partition wall 1 was a value measured by a mercury porosimeter. In FIG. 11, the mutual distance W1(a) of the partition walls 1 facing each other in the inflow cell $2_{IN}$ was 0.74 mm. The mutual distance W1(b) of the partition walls 1 facing each other in the inflow cell $2_{IN}$ was 2.44 mm. The protrusion height H (H1 and H2) of the protrusions 6a and 6b, respectively, was 0.11 mm.

As shown in FIG. 11, in the honeycomb structure according to the above Example 1, the partition walls 1 which partition the inflow cell $2_{IN}$ and the outflow cell $2_{OUT}$ is provided with the two protrusions 6a and 6b. As described above, in the case in which the partition walls 1 which partition the inflow cell $2_{IN}$ and the outflow cell $2_{OUT}$ are provided with the two protrusions 6a and 6b, a "IN-OUT partition wall" is shown in a column of the "position of protrusion" in the following Table 1. In the case in which the partition walls 1 which partition the inflow cells $2_{IN}$ from each other is provided with the two protrusions 6a and 6b, a "IN-IN partition wall" is shown in a column of the "position of protrusion" in the following Table 3 and Table 10.

As shown in FIG. 11, the extending directions of the two protrusions 6a and 6b disposed on the partition walls 1 facing each other were a 90° direction with respect to the surface of the partition wall 1. The width Y (Y1 and Y2) of the two protrusions 6a and 6b, respectively, was 0.27 mm. In the honeycomb structure of the above Example 1, the ratios of the protrusion heights H of the two protrusions 6a and 6b to the mutual distance W1(a) each become 15%. In the above Example 1, each of the two protrusions 6a and 6b disposed on the partition walls 1 facing each other has the same shape. The extending directions of the two protrusions 6a and 6b disposed on the partitions walls 1 facing each other are shown in the column of the "extending direction of protrusion" in the following Table 1. The angle described in the column of the "extending direction of protrusion" indicates a size of an angle formed by the "extending direction of the protrusion" and the "extending direction of the partition wall provided with the protrusion". When the "extending direction of the partition wall which is in contact with the bottom portion on one edge side of the protrusion" and the "extending direction of the partition wall which is in contact with the bottom portion on the other edge side of the protrusion" are different from each other, an angle smaller than the formed angle is described in a column of the "extending direction of protrusion".

TABLE 1

| | Thickness of partition wall T (mm) | Mutual distance of partition walls of first cell (inflow cell) W1(a) (mm) | W1(b) (mm) | Mutual distance of partition walls of second cell (outflow cell) W2 (mm) | Position of protrusion | Extending direction of protrusion | Protrusion height H (mm) | Width of protrusion Y (mm) | H/W1(a) (%) |
|---|---|---|---|---|---|---|---|---|---|
| Comparative Example 1 | 0.30 | 0.74 | 2.44 | 1.40 | No presence | — | — | — | — |
| Comparative Example 2 | 0.30 | 0.74 | 2.44 | 1.40 | IN-OUT partition wall | 90° | 0.06 | 0.27 | 8 |
| Example 1 | 0.30 | 0.74 | 2.44 | 1.40 | IN-OUT partition wall | 90° | 0.11 | 0.27 | 15 |
| Example2 | 0.30 | 0.74 | 2.44 | 1.40 | IN-OUT partition wall | 90° | 0.16 | 0.27 | 22 |
| Example 3 | 0.30 | 0.74 | 2.44 | 1.40 | IN-OUT partition wall | 90° | 0.22 | 0.27 | 30 |
| Example 4 | 0.30 | 0.74 | 2.44 | 1.40 | IN-OUT partition wall | 90° | 0.28 | 0.27 | 38 |
| Example 5 | 0.30 | 0.74 | 2.44 | 1.40 | IN-OUT partition wall | 90° | 0.36 | 0.27 | 49 |
| Example 6 | 0.30 | 0.74 | 2.44 | 1.40 | IN-OUT partition wall | 90° | 0.40 | 0.27 | 54 |
| Example 7 | 0.30 | 0.74 | 2.44 | 1.40 | IN-OUT partition wall | 90° | 0.48 | 0.27 | 65 |
| Example 8 | 0.30 | 0.74 | 2.44 | 1.40 | IN-OUT partition wall | 90° | 0.56 | 0.27 | 76 |
| Example 9 | 0.30 | 0.74 | 2.44 | 1.40 | IN-OUT partition wall | 90° | 0.67 | 0.27 | 90 |
| Comparative Example 3 | 0.30 | 0.74 | 2.44 | 1.40 | IN-OUT partition wall | 90° | 0.68 | 0.27 | 92 |
| Comparative Example 4 | 0.30 | 0.74 | 2.44 | 1.40 | IN-OUT partition wall | 90° | 0.70 | 0.27 | 95 |
| Comparative Example 5 | 0.30 | 0.74 | 2.44 | 1.40 | IN-OUT partition wall | 90° | 0.72 | 0.27 | 97 |

TABLE 2

| | Pressure loss (kPa) | Reduction rate | Determination |
|---|---|---|---|
| Comparative Example 1 | 6.00 | 1.00 | Not acceptable |
| Comparative Example 2 | 5.73 | 0.96 | Not acceptable |
| Example 1 | 5.40 | 0.90 | Excellent |
| Example2 | 5.30 | 0.88 | Excellent |
| Example 3 | 5.25 | 0.88 | Excellent |
| Example 4 | 5.15 | 0.86 | Excellent |
| Example 5 | 5.10 | 0.85 | Excellent |
| Example 6 | 5.13 | 0.86 | Excellent |
| Example 7 | 5.21 | 0.87 | Excellent |

TABLE 2-continued

|  | Pressure loss (kPa) | Reduction rate | Determination |
|---|---|---|---|
| Example 8 | 5.29 | 0.88 | Excellent |
| Example 9 | 5.40 | 0.90 | Excellent |
| Comparative Example 3 | 5.73 | 0.96 | Not acceptable |
| Comparative Example 4 | 6.00 | 1.00 | Not acceptable |
| Comparative Example 5 | 6.50 | 1.08 | Not acceptable |

Examples 2 to 9, Comparative Examples 1 to 5

The honeycomb structure was manufactured in the same manner as the above Example 1 except that the configurations of the two protrusions disposed on the partition walls facing each other were changed as shown in the above Table 1. In Comparative Example 1, the honeycomb structure was manufactured without providing the protrusions protruding into the inflow cell which is the first cell.

In relation to Examples 1 to 9 and Comparative Examples 1 to 5, the pressure loss was measured by the following method. In addition, the reduction rate of the pressure loss was calculated based on the value of the measured pressure loss. When the pressure loss of the honeycomb structure of Comparative Example 1 is set to be 1.00, the reduction rate of the pressure loss refers to the ratios of the pressure losses of the honeycomb structures of the respective Examples and Comparative Examples. The determination on the honeycomb structures of the respective Examples and Comparative Examples was made based on the value of the reduction rate of the pressure loss. The case in which the reduction rate of the pressure loss is equal to or more than 10% was determined as "excellent", the case in which the reduction rate of the pressure loss is equal to or more than 5% and less than 10% was determined as "good", and the case in which the reduction rate of the pressure loss is less than 5% was determined as "not acceptable". The respective results are shown in the above Table 2.

(Pressure Loss)

First, the honeycomb structure was mounted on an exhaust pipe provided with a soot generation apparatus. Next, the soot generation apparatus was operated to control a temperature of exhaust gas to be 200° C., a flow rate of the exhaust gas to be about 2.3 Nm$^3$/min, and PM included in the exhaust gas to be emitted to be deposited on the honeycomb structure. Pressures of pressure gauges attached to the front and rear of the honeycomb structure were measured in a state in which the deposited amount of the PM becomes 4 g/L to obtain a differential pressure of the front and rear. The differential pressure is set to be the pressure loss of the honeycomb structure.

Examples 10 to 19, Comparative Examples 6 to 10

In Examples 10 to 19 and Comparative Examples 7 to 10, as shown in FIG. 12, the honeycomb structure in which the partitions walls 1 which partition the first cells 2a from each other are provided with the protrusions 6a and 6b was manufactured. The method for manufacturing the honeycomb structure is the same as the above Example 1 except that the configurations of the two protrusions disposed on the partition walls facing each other were changed as shown in the following Table 3. It should be noted that each of the two protrusions 6a and 6b disposed on the partition walls 1 facing each other has the same shape. In Comparative Example 6, the honeycomb structure was manufactured without the protrusion protruding into the inflow cell which is the first cell. For the manufactured honeycomb structure, the pressure loss was measured in the same manner as the above Example 1. In addition, the reduction rate of the pressure loss was calculated based on the measured value of the pressure loss and the honeycomb structures of the respective Examples and Comparative Examples were determined. It should be noted that the honeycomb structure, which is the criterion for the determination, was the honeycomb structure of Comparative Example 6. The following Table 4 shows the respective results.

TABLE 3

|  | Thickness of partition wall T (mm) | Mutual distance of partition walls of first cell (inflow cell) | | Mutual distance of partition walls of second cell (outflow cell) W2 (mm) | Position of protrusion | Extending direction of protrusion | Protrusion height H (mm) | Width of protrusion Y (mm) | H/W1(b) (%) |
|---|---|---|---|---|---|---|---|---|---|
|  |  | W1(a) (mm) | W1(b) (mm) |  |  |  |  |  |  |
| Comparative Example 6 | 0.30 | 0.74 | 2.44 | 1.40 | No presence | — | — | — | — |
| Comparative Example 7 | 0.30 | 0.74 | 2.44 | 1.40 | IN-IN partition wall | 45° | 0.20 | 0.27 | 8 |
| Example 10 | 0.30 | 0.74 | 2.44 | 1.40 | IN-IN partition wall | 45° | 0.36 | 0.27 | 15 |
| Example 11 | 0.30 | 0.74 | 2.44 | 1.40 | IN-IN partition wall | 45° | 0.56 | 0.27 | 23 |
| Example 12 | 0.30 | 0.74 | 2.44 | 1.40 | IN-IN partition wall | 45° | 0.78 | 0.27 | 32 |
| Example 13 | 0.30 | 0.74 | 2.44 | 1.40 | IN-IN partition wall | 45° | 0.93 | 0.27 | 38 |
| Example 14 | 0.30 | 0.74 | 2.44 | 1.40 | IN-IN partition wall | 45° | 1.16 | 0.27 | 48 |
| Example 15 | 0.30 | 0.74 | 2.44 | 1.40 | IN-IN partition wall | 45° | 1.38 | 0.27 | 57 |
| Example 16 | 0.30 | 0.74 | 2.44 | 1.40 | IN-IN partition wall | 45° | 1.52 | 0.27 | 62 |
| Example 17 | 0.30 | 0.74 | 2.44 | 1.40 | IN-IN partition wall | 45° | 1.76 | 0.27 | 72 |
| Example 18 | 0.30 | 0.74 | 2.44 | 1.40 | IN-IN partition wall | 45° | 2.00 | 0.27 | 82 |
| Example 19 | 0.30 | 0.74 | 2.44 | 1.40 | IN-IN partition wall | 45° | 2.20 | 0.27 | 90 |
| Comparative Example 8 | 0.30 | 0.74 | 2.44 | 1.40 | IN-IN partition wall | 45° | 2.25 | 0.27 | 92 |
| Comparative Example 9 | 0.30 | 0.74 | 2.44 | 1.40 | IN-IN partition wall | 45° | 2.30 | 0.27 | 94 |
| Comparative Example 10 | 0.30 | 0.74 | 2.44 | 1.40 | IN-IN partition wall | 45° | 2.40 | 0.27 | 98 |

TABLE 4

|  | Pressure loss (kPa) | Reduction rate | Determination |
|---|---|---|---|
| Comparative Example 6 | 6.00 | 1.00 | Not acceptable |
| Comparative Example 7 | 5.73 | 0.96 | Not acceptable |
| Example 10 | 5.40 | 0.90 | Excellent |

TABLE 4-continued

|  | Pressure loss (kPa) | Reduction rate | Determination |
|---|---|---|---|
| Example 11 | 5.25 | 0.88 | Excellent |
| Example 12 | 5.20 | 0.87 | Excellent |
| Example 13 | 5.15 | 0.86 | Excellent |
| Example 14 | 5.16 | 0.86 | Excellent |
| Example 15 | 5.20 | 0.87 | Excellent |
| Example 16 | 5.23 | 0.87 | Excellent |
| Example 17 | 5.28 | 0.88 | Excellent |
| Example 18 | 5.32 | 0.88 | Excellent |
| Example 19 | 5.40 | 0.90 | Excellent |
| Comparative Example 8 | 5.80 | 0.97 | Not acceptable |
| Comparative Example 9 | 6.20 | 1.03 | Not acceptable |
| Comparative Example 10 | 6.50 | 1.08 | Not acceptable |

Examples 20 to 28, Comparative Example 11

The honeycomb structure was manufactured in the same manner as the above Example 1 except that the configurations of the two protrusions disposed on the partition walls facing each other were changed as shown in the following Table 5. In Comparative Example 11, the honeycomb structure was manufactured without the protrusion protruding into the inflow cell which is the first cell. For the manufactured honeycomb structure, the pressure loss was measured in the same manner as the above Example 1. In addition, the reduction rate of the pressure loss was calculated based on the measured value of the pressure loss and the honeycomb structures of the respective Examples and Comparative Examples were determined. It should be noted that the honeycomb structure, which is the criterion for the determination, was the honeycomb structure of Comparative Example 11. The following Table 6 shows the respective results. It should be noted that in the following Table 5, a column of "Y/T" shows a ratio (%) of the width Y (mm) of the protrusion to the thickness T (mm) of the partition wall.

TABLE 5

|  | Thickness of partition wall T (mm) | Mutual distance of partition walls of first cell | | Mutual distance of partition walls of second cell W2 (mm) | Position of protrusion | Extending direction of protrusion | Protrusion height H (mm) | Width of protrusion Y (mm) | H/W1(a) (%) | Y/T (%) |
|---|---|---|---|---|---|---|---|---|---|---|
|  |  | W1(a) (mm) | W1(b) (mm) |  |  |  |  |  |  |  |
| Comparative Example 11 | 0.30 | 0.74 | 2.44 | 1.40 | No presence | — | — | — | — | — |
| Example 20 | 0.30 | 0.74 | 2.44 | 1.40 | IN-OUT partition wall | 90° | 0.30 | 0.10 | 41 | 33 |
| Example 21 | 0.30 | 0.74 | 2.44 | 1.40 | IN-OUT partition wall | 90° | 0.30 | 0.20 | 41 | 66 |
| Example 22 | 0.30 | 0.74 | 2.44 | 1.40 | IN-OUT partition wall | 90° | 0.30 | 0.25 | 41 | 82 |
| Example 23 | 0.30 | 0.74 | 2.44 | 1.40 | IN-OUT partition wall | 90° | 0.30 | 0.30 | 41 | 99 |
| Example 24 | 0.30 | 0.74 | 2.44 | 1.40 | IN-OUT partition wall | 90° | 0.30 | 0.35 | 41 | 115 |
| Example 25 | 0.30 | 0.74 | 2.44 | 1.40 | IN-OUT partition wall | 90° | 0.30 | 0.40 | 41 | 132 |
| Example 26 | 0.30 | 0.74 | 2.44 | 1.40 | IN-OUT partition wall | 90° | 0.30 | 0.45 | 41 | 148 |
| Example 27 | 0.30 | 0.74 | 2.44 | 1.40 | IN-OUT partition wall | 90° | 0.30 | 0.50 | 41 | 164 |
| Example 28 | 0.30 | 0.74 | 2.44 | 1.40 | IN-OUT partition wall | 90° | 0.30 | 0.50 | 41 | 164 |

TABLE 6

|  | Pressure loss (kPa) | Reduction rate | Determination |
| --- | --- | --- | --- |
| Comparative Example 11 | 6.00 | 1.00 | Not acceptable |
| Example 20 | 5.40 | 0.90 | Excellent |
| Example 21 | 5.40 | 0.90 | Excellent |
| Example 22 | 5.40 | 0.90 | Excellent |
| Example 23 | 5.40 | 0.90 | Excellent |
| Example 24 | 5.50 | 0.92 | Good |
| Example 25 | 5.55 | 0.93 | Good |
| Example 26 | 5.60 | 0.93 | Good |
| Example 27 | 5.61 | 0.94 | Good |
| Example 28 | 5.67 | 0.95 | Good |

Examples 29 to 34, Comparative Examples 12 to 14

The honeycomb structure was manufactured in the same manner as the above Example 1 except that the thickness of the partition wall and the configurations of the two protrusions disposed on the partition walls facing each other were changed as shown in the following Table 7. In Comparative Examples 12 to 14, the honeycomb structure was manufactured without the protrusion protruding into the inflow cell which is the first cell. For the manufactured honeycomb structure, the pressure loss was measured in the same manner as the above Example 1. In addition, the reduction rate of the pressure loss was calculated based on the measured value of the pressure loss and the honeycomb structures of the respective Examples and Comparative Examples were determined. It should be noted that the honeycomb structure, which is the criterion for the determination, is as follows. Examples 29 and 30 used the honeycomb structure of Comparative Example 12 as the criterion for the determination. Examples 31 and 32 used the honeycomb structure of Comparative Example 13 as the criterion for the determination. Examples 33 and 34 used the honeycomb structure of Comparative Example 14 as the criterion for the determination.

TABLE 7

|  | Thickness of partition wall T (mm) | Mutual distance of partition walls of first cell | | Mutual distance of partition walls of second cell W2 (mm) | Position of protrusion | Extending direction of protrusion | Protrusion height H1 (mm) | Width of protrusion Y1 (mm) | H/W1(a) (%) | Y1/T (%) |
| --- | --- | --- | --- | --- | --- | --- | --- | --- | --- | --- |
|  |  | W1(a) (mm) | W1(b) (mm) |  |  |  |  |  |  |  |
| Comparative Example 12 | 0.25 | 0.79 | 2.56 | 1.45 | No presence | — | — | — | — | — |
| Example 29 | 0.25 | 0.79 | 2.56 | 1.45 | IN-OUT partition wall | 90° | 0.30 | 0.24 | 38 | 96 |
| Example 30 | 0.25 | 0.79 | 2.56 | 1.45 | IN-OUT partition wall | 90° | 0.30 | 0.30 | 38 | 120 |
| Comparative Example 13 | 0.20 | 0.84 | 2.69 | 1.50 | No presence | — | — | — | — | — |
| Example 31 | 0.20 | 0.84 | 2.69 | 1.50 | IN-OUT partition wall | 90° | 0.30 | 0.19 | 36 | 95 |
| Example 32 | 0.20 | 0.84 | 2.69 | 1.50 | IN-OUT partition wall | 90° | 0.30 | 0.25 | 36 | 125 |
| Comparative Example 14 | 0.36 | 0.69 | 2.32 | 1.34 | No presence | — | — | — | — | — |
| Example 33 | 0.36 | 0.69 | 2.32 | 1.34 | IN-OUT partition wall | 90° | 0.30 | 0.35 | 43 | 97 |
| Example 34 | 0.36 | 0.69 | 2.32 | 1.34 | IN-OUT partition wall | 90° | 0.30 | 0.40 | 43 | 111 |

TABLE 8

|  | Pressure loss (kpa) | Reduction rate | Determination |
|---|---|---|---|
| Comparative Example 12 | 5.90 | 1.00 | Not acceptable |
| Example 29 | 5.20 | 0.88 | Excellent |
| Example 30 | 5.40 | 0.92 | Good |
| Comparative Example 13 | 5.80 | 1.00 | Not acceptable |
| Example 31 | 5.10 | 0.88 | Excellent |
| Example 32 | 5.30 | 0.91 | Good |
| Comparative Example 14 | 6.20 | 1.00 | Not acceptable |
| Example 33 | 5.40 | 0.87 | Excellent |
| Example 34 | 5.70 | 0.92 | Good |

Examples 35 to 41, Comparative Example 15

The honeycomb structure was manufactured in the same manner as the above Example 1 except that the configurations of the two protrusions disposed on the partition walls facing each other were changed as shown in the following Tables 9 and 10. In Comparative Example 15, the honeycomb structure was manufactured without the protrusion protruding into the inflow cell which is the first cell. Specific configurations of each protrusion are as shown in the following Tables 9 and 10. In the following Table 10, the "protrusion A" means the protrusion provided on the IN-OUT partition wall, and the "protrusion B" means the protrusion provided on the IN-IN partition wall. For the manufactured honeycomb structure, the pressure loss was measured in the same manner as the above Example 1. In addition, the reduction rate of the pressure loss was calculated based on the measured value of the pressure loss and the honeycomb structures of the respective Examples and Comparative Examples were determined. It should be noted that the honeycomb structure, which is the criterion for the determination, was the honeycomb structure of Comparative Example 15. The following Table 11 shows the respective results.

TABLE 9

|  | Thickness of partition wall | Mutual distance of partition walls of first cell | | Mutual distance of partition walls of second cell | | | The total number of protrusions (Number) |
|---|---|---|---|---|---|---|---|
|  | T (mm) | W1(a) (mm) | W1(b) (mm) | W2 (mm) | H/W1(a) (%) | H/W1(b) (%) | |
| Comparative Example 15 | 0.30 | 0.74 | 2.44 | 1.40 | — | — | — |
| Example 35 | 0.30 | 0.74 | 2.44 | 1.40 | 24 | — | 2 |
| Example 36 | 0.30 | 0.74 | 2.44 | 1.40 | — | 25 | 2 |
| Example 37 | 0.30 | 0.74 | 2.44 | 1.40 | 60 | — | 4 |
| Example 38 | 0.30 | 0.74 | 2.44 | 1.40 | — | 25 | 4 |
| Example 39 | 0.30 | 0.74 | 2.44 | 1.40 | 24 | 25 | 4 |
| Example 40 | 0.30 | 0.74 | 2.44 | 1.40 | 24 | 25 | 6 |
| Example 41 | 0.30 | 0.74 | 2.44 | 1.40 | 65 | 25 | 6 |

TABLE 10

| | Protrusion A | | | | | Protrusion B | | | | |
|---|---|---|---|---|---|---|---|---|---|---|
| | Protrusion height H (mm) | Width of protrusion Y (mm) | The number of protrusions (Number) | Position of protrusion | Extending direction of protrusion | Protrusion height H (mm) | Width of protrusion Y (mm) | The number of protrusions (Number) | Position of protrusion | Extending direction of protrusion |
| Comparative Example 15 | — | — | — | — | — | — | — | — | — | — |
| Example 35 | 0.18 | 0.26 | 2 | IN-OUT partition wall | 90° | — | — | 0 | — | — |
| Example 36 | — | — | 0 | — | — | 0.62 | 0.26 | 2 | IN-IN partition wall | 45° |
| Example 37 | 0.18 | 0.26 | 4 | IN-OUT partition wall | 90° | — | — | 0 | — | — |
| Example 38 | — | — | 0 | — | — | 0.62 | 0.26 | 4 | IN-IN partition wall | 45° |
| Example 39 | 0.18 | 0.26 | 2 | IN-OUT partition wall | 90° | 0.62 | 0.26 | 2 | IN-IN partition wall | 45° |
| Example 40 | 0.18 | 0.26 | 4 | IN-OUT partition wall | 90° | 0.62 | 0.26 | 2 | IN-IN partition wall | 45° |
| Example 41 | 0.18 | 0.26 | 2 | IN-OUT partition wall | 90° | 0.62 | 0.26 | 4 | IN-IN partition wall | 45° |

TABLE 11

| | Pressure loss (kPa) | Reduction rate | Determination |
|---|---|---|---|
| Comparative Example 15 | 6.00 | 1.00 | Not acceptable |
| Example 35 | 5.20 | 0.87 | Excellent |
| Example 36 | 5.10 | 0.85 | Excellent |
| Example 37 | 5.10 | 0.85 | Excellent |
| Example 38 | 5.00 | 0.83 | Excellent |
| Example 39 | 5.10 | 0.85 | Excellent |
| Example 40 | 5.60 | 0.93 | Good |
| Example 41 | 5.70 | 0.95 | Good |

(Result)

The honeycomb structures of Examples 1 to 41 have two or more protrusions protruding into the inflow cell which is the first cell, in which the two protrusions are each disposed not to at least partially overlap with each other on the extended lines in the extending directions of the respective protrusions. In the honeycomb structures of Examples 1 to 41, each of the protrusion heights H1 and H2 of the two protrusions was 15% or more and 90% or less with respect to the mutual distance W of the partition walls facing each other. In the honeycomb structures of Examples 1 to 41, the reduction in the pressure loss was confirmed. Meanwhile, in the honeycomb structures of Comparative Examples 1 to 15, the reduction rate of the pressure loss was reduced. In addition, since there are more preferable values for the width of the protrusion and the thickness of the partition wall corresponding to the shape of the protrusion, it was found that the pressure loss can be further reduced by adjusting these values.

The honeycomb structure of the present invention can be particularly advantageously used for applications such as an exhaust gas purification treatment apparatus for purifying particulate matters such as particulates included in a fluid such as exhaust gas emitted from a diesel engine, a gasoline engine, or the like.

DESCRIPTION OF REFERENCE NUMERALS

1,21,41,61: Partition wall, 2,22,42,62: Cell, 2a,22a,42a,62a: First cell, 2b,22b,42b,62b: Second cell, $2_{IN}$: Inflow cell, $2_{OUT}$: Outflow cell, 3: Circumferential wall, 5: Plugging portion, 6: Protrusion, 6a: First protrusion, 6b: Second protrusion, 11: First end face, 12: Second end face, P1: Middle point of bottom portion of protrusion, P2: middle point of a width of protrusion at half position of a height of protrusion, 100,200,300,400: Honeycomb structure

What is claimed is:

1. A honeycomb structure, comprising:
a plurality of porous partition walls defining a plurality of cells which become a fluid channel extending from a first end face to a second end face,
wherein the plurality of cells include a first cell in which an end portion on the first end face side is open and an end portion on the second end face side is plugged and a second cell in which an end portion on the first end face side is plugged and an end portion on the second end face side is open,
the honeycomb structure is configured to pass a fluid introduced from the first end face side through the partition walls to emit the fluid into the second cell as a filtration fluid and emit the filtration fluid from the second end face side,
in a cross section orthogonal to an extending direction of the cell, the first cell is disposed around the second cell,
an open frontal area of the first cell on the first end face is larger than that of the second cell on the second end face,
on the partition walls disposed to surround the at least one first cell, each of the at least one pair of partition walls having the first cell sandwiched therebetween is provided with a protrusion which protrudes into the first cell,
among the two protrusions disposed on the partition walls facing each other, the protrusion disposed on the first partition wall is defined as a first protrusion and the protrusion disposed on the second partition wall is defined as a second protrusion,
the first protrusion and the second protrusion are each disposed not to overlap with each other on extended lines in extending directions of the respective protrusions, and
a protrusion height (H1) of the first protrusion and a protrusion height (H2) of the second protrusion are each equal to or more than 15% and equal to or less than 90% with respect to a mutual distance W of the partition walls facing each other.

2. The honeycomb structure according to claim 1, wherein a width (Y1) of the first protrusion is smaller than a thickness (T1) of the partition wall provided with the first protrusion, and
a width (Y2) of the second protrusion is smaller than a thickness (T2) of the partition wall provided with the second protrusion.

3. The honeycomb structure according to claim 1, wherein the total number of protrusions protruding into the one first cell is equal to or less than 4.

\* \* \* \* \*